United States Patent [19]

Kanke et al.

[11] Patent Number: 4,653,099

[45] Date of Patent: Mar. 24, 1987

[54] SP SOUND SYNTHESIZER

[75] Inventors: Takao Kanke; Susumu Takashima; Naoki Inagaki, all of Tokyo, Japan

[73] Assignee: Casio Computer Co., Ltd., Tokyo, Japan

[21] Appl. No.: 489,596

[22] Filed: Apr. 28, 1983

[30] Foreign Application Priority Data

| | | | |
|---|---|---|---|
| May 11, 1982 | [JP] | Japan | 57-78682 |
| May 11, 1982 | [JP] | Japan | 57-78683 |
| May 11, 1982 | [JP] | Japan | 57-78684 |
| May 11, 1982 | [JP] | Japan | 57-78685 |

[51] Int. Cl.[4] .......... G01L 5/00

[52] U.S. Cl. .......... 381/51

[58] Field of Search .......... 381/29-53; 364/513, 513.5; 446/204; 340/392

[56] References Cited

U.S. PATENT DOCUMENTS

| | | | |
|---|---|---|---|
| 4,393,272 | 7/1983 | Itakura et al. | 381/51 |
| 4,541,111 | 9/1985 | Takashima et al. | 381/51 |

*Primary Examiner*—E. S. Matt Kemeny

*Attorney, Agent, or Firm*—Frishauf, Holtz, Goodman & Woodward

[57] ABSTRACT

In an LSP sound synthesizer, LSP transform parameters for three types of sounds are prestored: human, bird, and insect. For synthesis, the inverse transform is modified to increase the quality of each type of sound: a parameter converter uses a uniform-frequency distribution (of gain) for human, a mid-frequency concentration for bird, and a high-frequency concentration for insect sounds.

4 Claims, 22 Drawing Figures

| A | B | T | | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|---|---|
| 0 | 0 | 0 | $I_H$ | 0 | 0 | 0 | 0 | 0 | 1 | 1 | 1 | 1 | · | · | · | · | 1 | 1 | [1023] |
| | | 1 | $I_L$ | 1 | 1 | · | · | 1 | 1 | 1 | 1 | 1 | 1 | 0 | 0 | 0 | 0 | 0 | |
| 1 | 0 | 0 | $I_H$ | 0 | 0 | 0 | 0 | 0 | 0 | 0 | 1 | 1 | 1 | 1 | 1 | 1 | 1 | 1 | [255] |
| | | 1 | $I_L$ | 1 | 1 | · | · | 1 | 1 | 1 | 1 | 1 | 1 | 1 | 1 | 0 | 0 | 0 | |
| 0 | 1 | 0 | $I_H$ | 0 | 0 | 0 | 0 | 0 | 0 | 1 | 1 | 1 | · | · | · | · | · | 1 | [511] |
| | | 1 | $I_L$ | 1 | 1 | · | · | 1 | 1 | 1 | 1 | 1 | 1 | 0 | 0 | 0 | 0 | 0 | |
| 1 | 1 | 0 | $I_H$ | 0 | · | · | · | 0 | 0 | 0 | 0 | 1 | 1 | · | · | · | 1 | 1 | [127] |
| | | 1 | $I_L$ | 1 | 1 | · | · | 1 | 1 | 1 | 1 | 1 | 1 | 0 | 0 | 0 | 0 | 0 | |

FIG. 13

| | T1 | T2 | T3 | T4 | T5 | T6 | T7 | T8 | T9 | T10 | T11 | T12 | T13 | T14 | T15 | T16 | T17 | T18 | T19 | T20 |
|---|---|---|---|---|---|---|---|---|---|---|---|---|---|---|---|---|---|---|---|---|
| ØA | | O | | O | | O | | O | | O | | O | | O | | O | | O | | O |
| ØB | O | | O | | O | | O | | O | | O | | O | | O | | O | | O | |
| ØC | O | | | | | | | | | | | | | | | | | | | |
| ØD | O | | O | | O | | O | | O | | O | | O | | O | | | | | |
| ØE | | | | | | O | | | | | | | | | | | | | | |
| ØF | | | | | O | | O | | O | | O | | O | | O | | O | | O | |
| ØG | | | | | | | | | | | | | | | | | O | O | O | O |
| ØH | | | | | | O | | O | | O | | O | | O | | O | | O | | O |
| ØI | O | | O | | | | | | | | | | | | | | | | | |
| ØJ | | | | | O | | O | | O | | O | | O | | O | | O | | | |
| ØK | O | O | O | O | | | | | | | | | | | | | | | | |
| ØL | | | | | O | O | O | O | O | O | O | O | O | O | O | O | | | | |

FIG. 15A

| | MUL | | | FA | | |
|---|---|---|---|---|---|---|
| | A | B | OUTPUT | A | B | OUTPUT |
| $T_1$ | $C_{1L}$ | $e_1(n)$ | * | * | * | $U(n-2)$ |
| $T_2$ | $C_{1U}$ | $e_1(n)$ | * | * | * | * |
| $T_3$ | $C_{2L}$ | $e_2(n)$ | $C_{1L} \cdot e_1(n)$ | * | * | * |
| $T_4$ | $C_{2U}$ | $e_2(n)$ | $C_{1U} \cdot e_1(n)$ | $C_{1U} \cdot e_1(n)$ | $C_{1L} \cdot e_1(n)$ | * |
| $T_5$ | $C_{3L}$ | $e_3(n)$ | $C_{2L} \cdot e_2(n)$ | $2C_1 \cdot e_1(n)$ | $e_1(n-1)$ | $C_1 \cdot e_1(n)$ |
| $T_6$ | $C_{3U}$ | $e_3(n)$ | $C_{2U} \cdot e_2(n)$ | $C_{2U} \cdot e_2(n)$ | $C_{2L} \cdot e_2(n)$ | $e'_1(n)$ |
| $T_7$ | $C_{4L}$ | $e_4(n)$ | $C_{3L} \cdot e_3(n)$ | $2C_2 \cdot e_2(n)$ | $e_2(n-1)$ | $C_2 \cdot e_2(n)$ |
| $T_8$ | $C_{4U}$ | $e_4(n)$ | $C_{3U} \cdot e_3(n)$ | $C_{3U} \cdot e_3(n)$ | $C_{3L} \cdot e_3(n)$ | $e'_2(n)$ |
| $T_9$ | $C_{5L}$ | $e_5(n)$ | $C_{4L} \cdot e_4(n)$ | $2C_3 \cdot e_3(n)$ | $e_3(n-1)$ | $C_3 \cdot e_3(n)$ |
| $T_{10}$ | $C_{5U}$ | $e_5(n)$ | $C_{4U} \cdot e_4(n)$ | $C_{4U} \cdot e_4(n)$ | $C_{4L} \cdot e_4(n)$ | $e'_3(n)$ |
| $T_{11}$ | $C_{6L}$ | $e_6(n)$ | $C_{5L} \cdot e_5(n)$ | $2C_4 \cdot e_4(n)$ | $e_4(n-1)$ | $C_4 \cdot e_4(n)$ |
| $T_{12}$ | $C_{6U}$ | $e_6(n)$ | $C_{5U} \cdot e_5(n)$ | $C_{5U} \cdot e_5(n)$ | $C_{5L} \cdot e_5(n)$ | $e'_4(n)$ |
| $T_{13}$ | $C_{7L}$ | $e_7(n)$ | $C_{6L} \cdot e_6(n)$ | $2C_5 \cdot e_5(n)$ | $e_5(n-1)$ | $C_5 \cdot e_5(n)$ |
| $T_{14}$ | $C_{7U}$ | $e_7(n)$ | $C_{6U} \cdot e_6(n)$ | $C_{6U} \cdot e_6(n)$ | $C_{6L} \cdot e_6(n)$ | $e'_5(n)$ |
| $T_{15}$ | $C_{8L}$ | $e_8(n)$ | $C_{7L} \cdot e_7(n)$ | $2C_6 \cdot e_6(n)$ | $e_6(n-1)$ | $C_6 \cdot e_6(n)$ |
| $T_{16}$ | $C_{8U}$ | $e_8(n)$ | $C_{7U} \cdot e_7(n)$ | $C_{7U} \cdot e_7(n)$ | $C_{7L} \cdot e_7(n)$ | $e'_6(n)$ |
| $T_{17}$ | $A_L$ | $O_{10}(n-1)$ | $C_{8L} \cdot e_8(n)$ | $2C_7 \cdot e_7(n)$ | $e_7(n-1)$ | $C_7 \cdot e_7(n)$ |
| $T_{18}$ | $A_U$ | $O_{10}(n-1)$ | $C_{8U} \cdot e_8(n)$ | $C_{8U} \cdot e_8(n)$ | $e'_{8L} \cdot e_8(n)$ | $e'_7(n)$ |
| $T_{19}$ | * | * | $A_L \cdot O_{10}(n-1)$ | $2C_8 \cdot e_8(n)$ | $e_8(n-1)$ | $C_8 \cdot e_8(n)$ |
| $T_{20}$ | * | * | $A_U \cdot O_{10}(n-1)$ | $A_U \cdot O_{10}(n-1)$ | $A_L \cdot O_{10}(n-1)$ | $e'_8(n)$ |
| $T_1$ | $C_{1L}$ | $e_1(n+1)$ | * | * | * | $U(n-1)$ |

FIG. 15B

| FAS | | | S.R. | | | OUT |
|---|---|---|---|---|---|---|
| A | B | OUTPUT | INPUT | 8bit S.R. | 1bit S.R. | |
| e1(n) | e'1(n-1) | O10(n-1) | e1(n) | e'1(n-1) | e8(n-2) | U(n-2) |
| - * | * | e3(n) | Δ * | e'1(n-1) | e9(n-2) | |
| e2(n) | e'2(n-1) | * | e2(n) | e'2(n-1) | e9(n-2) | |
| - * | * | e4(n) | Δ * | e'2(n-1) | e1(n-1) | |
| e3(n) | e'3(n-1) | * | e3(n) | e'3(n-1) | e1(n-1) | |
| -e'1(n) | V(n) | e5(n) | Δ e'1(n) | e'3(n-1) | e2(n-1) | |
| e4(n) | e'4(n-1) | O1(n) | e4(n) | e'4(n-1) | e2(n-1) | |
| -e'2(n) | O1(n) | e6(n) | Δ e2(n) | e'4(n-1) | e3(n-1) | |
| e5(n) | e'5(n-1) | O2(n) | e5(n) | e'5(n-1) | e3(n-1) | |
| -e'3(n) | O2(n) | e7(n) | Δ e'3(n) | e'5(n-1) | e4(n-1) | |
| e6(n) | e'6(n-1) | O3(n) | e6(n) | e'6(n-1) | e4(n-1) | |
| -e'4(n) | O3(n) | e8(n) | Δ e'4(n) | e'6(n-1) | e5(n-1) | |
| e7(n) | e'7(n-1) | O4(n) | e7(n) | e'7(n-1) | e5(n-1) | |
| -e'5(n) | O4(n) | e9(n) | Δ e'5(n) | e'7(n-1) | e6(n-1) | |
| e8(n) | e'8(n-1) | O5(n) | e8(n) | e'8(n-1) | e6(n-1) | |
| -e'6(n) | O5(n) | e10(n) | Δ e'6(n) | e'8(n-1) | e7(n-1) | |
| e9(n) | O6(n) | O6(n) | e9(n) | * | e7(n-1) | |
| -e'7(n) | O7(n) | O7(n) | Δ e'7(n) | * | e8(n-1) | |
| e10(n) | C8(n) | O8(n) | | * | e8(n-1) | |
| -e'8(n) | O9(n) | O9(n) | Δ e'8(n) | * | e8(n-1) | |
| e1(n+1) | e'1(n) | O10(n) | e1(n+1) | e'1(n) | e8(n-1) | U(n-1) |

SP SOUND SYNTHESIZER

BACKGROUND OF THE INVENTION

The present invention relates to an LSP sound synthesizer which can singly synthesize a human voice and the notes of birds or insects, which have different distribution functions, resulting in a high quality effect.

In the field of sound synthesizing, a line spectrum pair (LSP) system has been developed and put to practical use. The LSP can synthesize sounds with a less amount of the sound data than the known PARCOR system, and can keep the synthesized sound at a predetermined quality level or at a higher level.

In synthesizing voices by the LSP system, the voices are nonlinearly quantized using the distribution functions of LSP parameters which differ with the kinds of the voices used. The quantized voice data is used for synthesizing the original voices. This method, which quantizes the sounds using the distribution functions of LSP parameters, is advantageous is that a small number of bits are required for forming a specific sound, that is, the sound information is reduced. However, it has some disadvantages.

When sounds with different distribution functions of LSP parameters, for example, a human voice and the notes of birds or insects, a quality of the sound synthesized by a single synthesizer is remarkably poor. FIG. 1A shows a graph illustrating voice distribution functions obtained from LSP parameters w of a female voice. FIGS. 1B and 1C show sound distribution functions of the notes of a bird and an insect, respectively. As seen from these figures, characteristic curves representing voice distribution functions of the human voice are uniformly distributed with respect to frequency. If the case of the bird's notes, the characteristic curves are distributed mainly in the middle frequency region. In the case of the insect's notes, the characteristic curves are chiefly in the high frequency region. Obviously, the frequency distributions of the characteristic curves differ according to the kinds of sounds used. Hardware for the synthesizer, which is designed so as to nonlinearly quantize voices using voice distribution functions based on the frequency distributions of a human voice, requires some modification if it is used to achieve hardware for the nonlinear quantization of the notes of birds or insects. If it is applied for such without any modification, the conversion of the LSP parameters w is inevitably accompanied by the inversion of the parameters. This parameter inversion deteriorates the synthesized sound quality so much that the synthesized and reproduced notes of birds or insects have no resemblance to the original ones. For these reasons, the technique for synthesizing the human voice and the notes of birds or insects by means of a single synthesizer is considered inappropriate.

SUMMARY OF THE INVENTION

Accordingly, an object of the present invention is to provide an LSP sound synthesizer which can singly perform a sound synthesization, of a human voice and the notes of birds or insects, resulting in a high quality effect.

To achieve this object, an LSP sound synthesizer according to the present invention comprises:

sound data memory means for storing sound data including sound source reference value data, parameter data, frame data, pitch data and amplitude data;

parameter converting means connected to the sound data memory means, for producing, on the basis of an inverse transform, converted parameter outputs;

sound source circuit means connected to the sound data memory means for receiving the pitch data and sound source reference value data from the sound data memory means and producing a predetermined sound source output; and digital filter means connected to the parameter conversion means and the sound source circuit means, the digital filter means synthesizing sounds on the basis of the frame data and the converted parameter outputs.

The parameter conversion means of the sound synthesizer of the invention stores a plurality of inverse transform functions and reads out an inverse conversion function which is most suitable for a sound to be synthesized. Since such a function for the sound synthesizing is used, the sound synthesizer can singly synthesize sounds having different distribution functions into a high quality effect.

BRIEF DESCRIPTION OF THE DRAWINGS

FIG. 13 shows a table showing generation timings of various types of timing signals for use in controlling key portions in the circuit of FIG. 12;

FIGS. 15A and 15B show a table showing input and output data in key portions of the circuits of FIG. 12 and FIGS. 14A and 14B;

DETAILED DESCRIPTION OF THE PREFERRED EMBODIMENT

Figure 2:
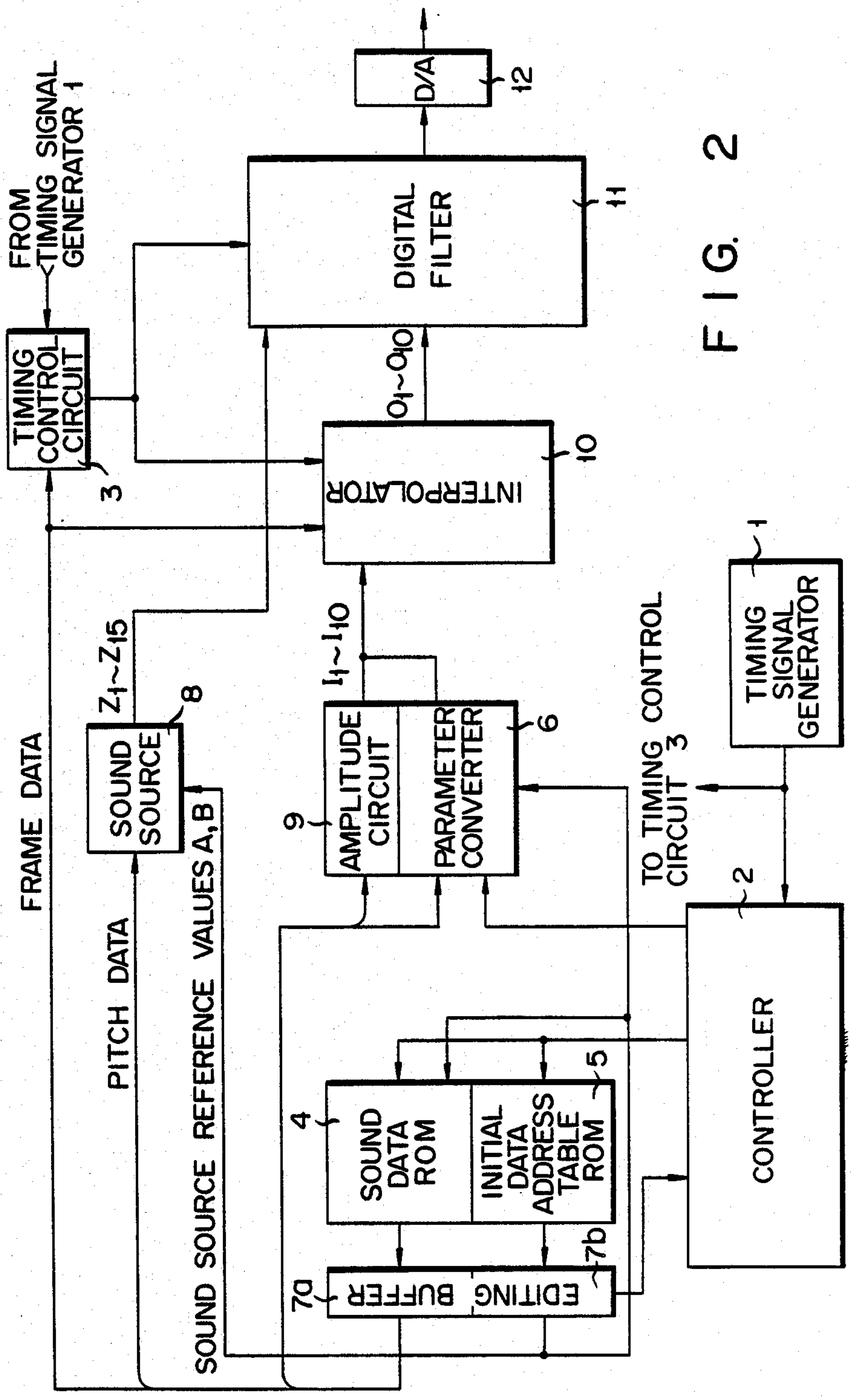
FIG. 2 is a block diagram of an LSP sound synthesizer which is an embodiment of the present invention.

An embodiment of the present invention will be described referring to the accompanying drawings. In FIG. 2, a timing signal generator 1 produces timing signals, which are supplied to a controller 2 and a timing control circuit 3. Control command signals are transferred from the controller 2 to a sound data ROM 4, an initial data address table ROM 5 (hereinafter referred to as an INA table ROM) and a parameter converter 6. The controller 2 controls the operations of the necessary portions in response to the input information externally applied. The sound data ROM 4 and INA table ROM 5 are addressed by the controller 2, so that the contents (i.e., sound data) of the sound data ROM 4 and the contents (i.e., initial data including address data) of the INA table ROM 5 are read out and loaded into editing buffers 7a and 7b, respectively. The data loaded into the buffer 7b is transferred to the controller 2, the sound data ROM 4 and the parameter converter 6. Sound reference values A and B from the editing buffer 7b are transferred to a sound source 8. The sound source reference values A and B take a combination of two bits. Four combinations, "0,0", "1,0", "0,1" and "1,1" are properly combined to provide four reference values, in the case of a voiced sound. The sound data held in the editing buffer 7a is transferred to the parameter converter 6 and an amplitude circuit 9. Of the sound data, the pitch data is transferred to the sound source 8 and the frame data to the timing control circuit 3 and an interpolator 10. The output signals $I_1$ to $I_{10}$ from the parameter converter 6 and the amplitude circuit 9 are interpolated by the interpolator 10 and supplied as parameter outputs $O_1$ to $O_{10}$ to a digital filter 11. In the case of the voiced sound, the sound source 8 selects one of the four reference values and produces sound data $Z_1$ to $Z_{15}$ of 15 bits, which are to be transmitted to the digital filter 11. The timing control circuit 3 generates a timing signal according to the frame data delivered from the buffer 7a and supplies it to the interpolator 10 and the digital filter 11. The digital filter 11 performs an LSP sound synthesization using the sound parameter outputs $O_1$ to $O_{10}$ coming through the interpolator 10 and the sound data $Z_1$ to $Z_{15}$ derived from the sound source 8. A digital sound signal produced from the digital filter 11 is converted into an analog sound signal by a digital-to-analog (D/A) converter 12.

Figure 3:
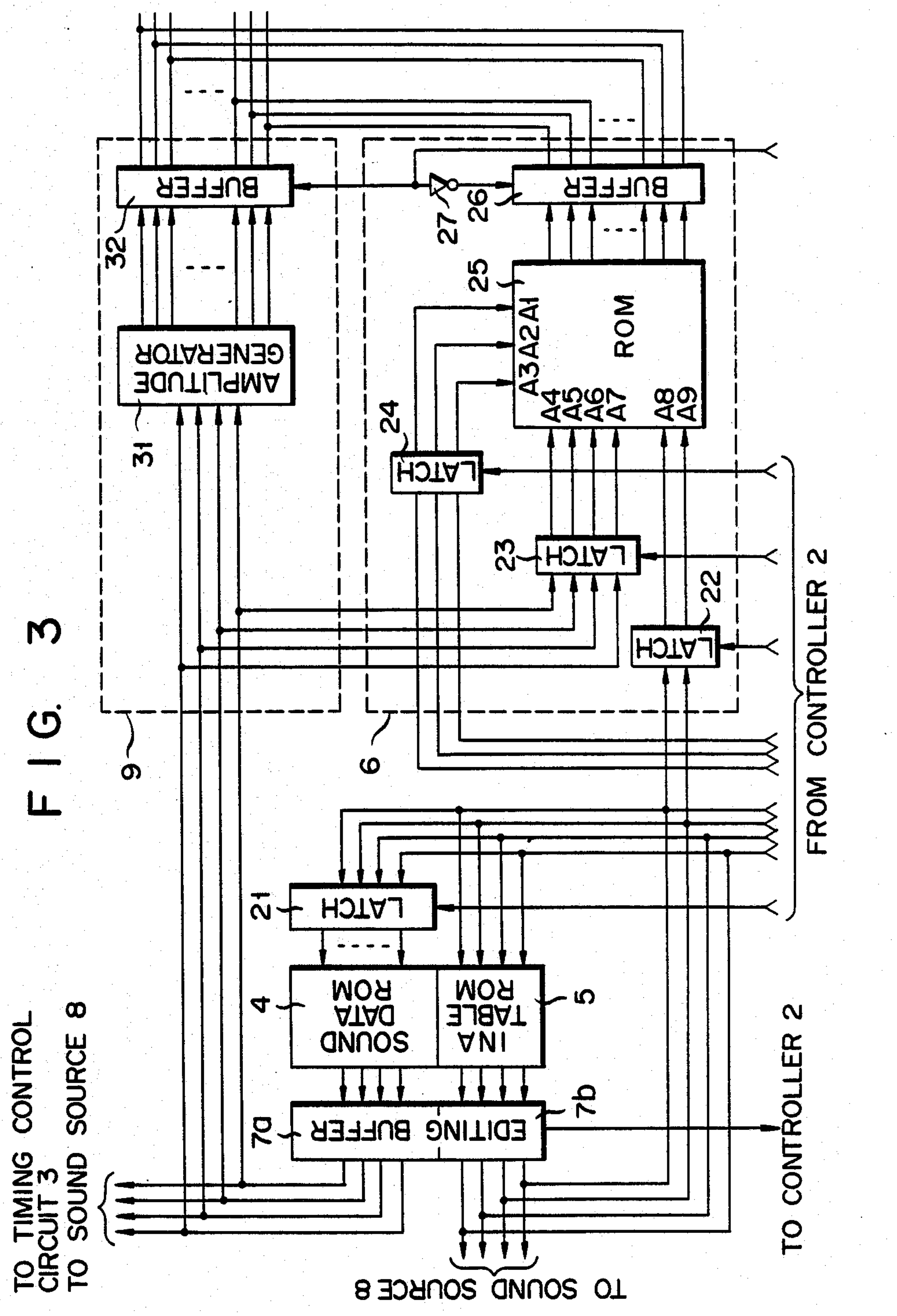
FIG. 3 is a block diagram of the key section used in the device shown in FIG. 2.
Figure 4:
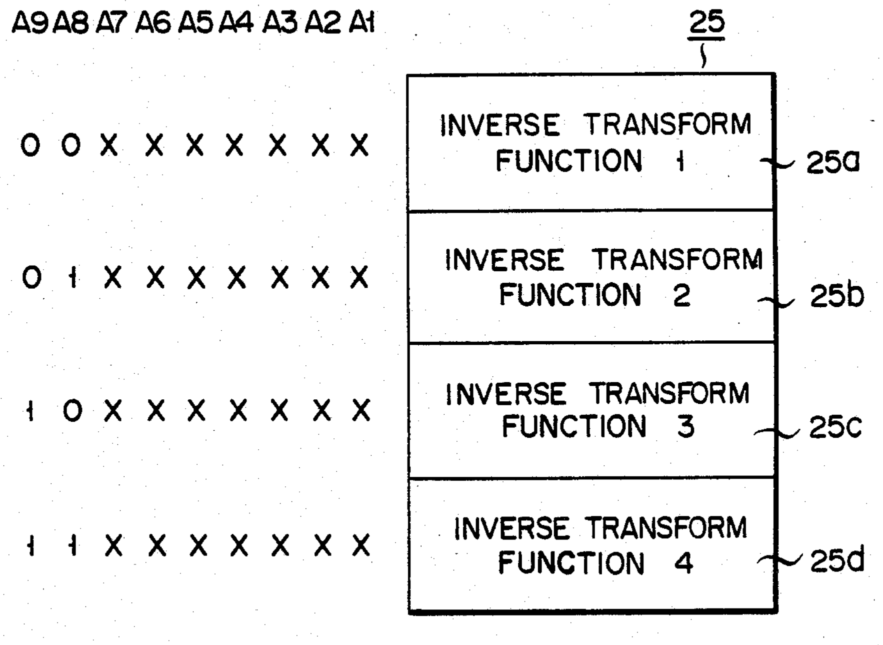
FIG. 4 illustrates the inverse transform functions stored in a parameter conversion circuit 6 shown in FIG. 2.

A combination of the sound data ROM 4, INA table ROM 5, parameter converter 6, and amplitude circuit 9 will be described in detail referring to FIG. 3. In the figure, a latch circuit 21 latches address data for the sound data ROM 4 which is delivered from the controller 2. The 4-bit data is read out from the sound data ROM 4 and the INA table ROM 5 and then temporarily stored in the editing buffers 7a and 7b. The 4-bit data held in the buffer 7b is transferred to the latch circuit 21 and two bits of the 4-bit data is transferred to the parameter converter 6. The parameter converter 6 is comprised of latch circuits 22 to 24, a ROM 25, and a tristate bus buffer 26. By a command from the controller 2, 2-bit data derived from the buffer 7b is latched in the latch circuit 22. The 4-bit data from the buffer 7a is latched in the latch circuit 23. The address data from the controller 2 is latched in the latch circuit 24. The data held in the latch circuits 22 to 24 are input as address data $A_9$ to $A_1$ to the ROM 25. As shown in FIG. 4, the ROM 25 has four memory areas 25a to 25d. The first memory area 25a stores a reverse conversion, (i.e. inverse transform) function 1 whose frequency distribution is uniform so as to adapt for a human voice. The second to fourth memory areas 25b to 25d store reverse conversion functions 2 to 4 whose frequency distributions are concentrated in the middle and high frequency regions so as to be adapted for the notes of birds and insects. These memory areas 25a to 25d of the ROM 25 are selectively specified by the address bits $A_9$ and $A_8$ held in the latch circuit 22. For example, as shown in FIG. 4, when $A_9$ and $A_8$ are "00", the first memory area 25a is specified. When they are "01", the second memory area 25b is selected. With "10" of the address bits, the third memory area is specified. With "11", the fourth memory area is specified. Further, from the ROM 25, 10-bit data is read out after the ROM is addressed by the bit data $A_9$ to $A_1$ and then temporarily stored in the buffer 26. The buffer 26 reads out data from the ROM 25 by a read command applied via an inverter 27 from the controller 2.

The amplitude circuit 9 is composed of a tristate bus buffer 32 for temporarily storing amplitude data representing a stress of a sound in the form of an amplitude, which is produced from the amplitude generator 31 for converting the 4-bit amplitude data from the editing buffer 7a into 10-bit amplitude data. The buffer 32 temporarily stores data coming from the amplitude generator 31 by a read command delivered from the controller 2. In this case, the read command is applied to the buffer 26 in the parameter converter 6 by way of the inverter 27, so that either of the buffers 26 and 32 is specified and the data stored therein is transferred as $I_1$ to $I_{10}$ to the interpolator 10. The parameter converter 6 as mentioned above is designed such that the parameter number is "8" and a 4-bit parameter is converted into a 10-bit parameter.

Figure 5:
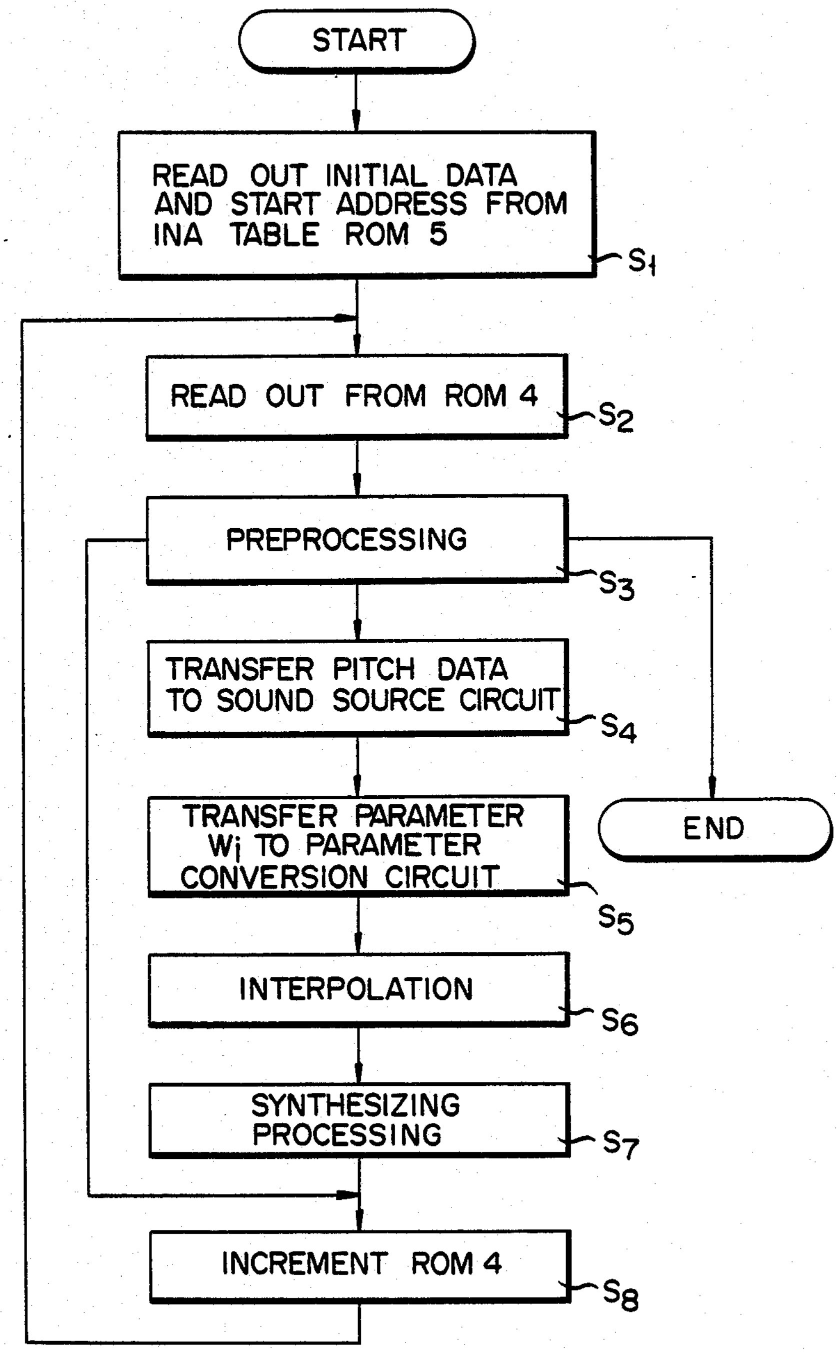
FIG. 5 is a flow chart illustrating the operation of this invention.

The operation of the above-mentioned embodiment will be described with reference to a flowchart in FIG. 5. The controller 2, when externally applied with input data, makes an access to the INA table ROM 5 to read out the initial data and a start address therefrom and to load them into the buffer 7b. Then, the synthesizer starts synthesizing sounds. The signals A and B for setting the sound source reference values are read out from the INA table ROM 5, transferred to the parameter converter 6 and set in the latch circuit 22. With the data latched in the latch circuit 22, one of the memory areas 25a to 25d of the ROM 25 is selectively specified. At this point, the setting of the initial condition is completed. The controller 2 advances the control step to a step S2. In the step S2, sound data is read out from the sound data ROM 4. In the next step S3, the preprocessing for the sound synthesizing is executed. In this synthesizer, the data of 4 bit-word is read out from the sound data ROM 4 and loaded into the buffer 7a. The editing is performed under the gate-control. The frame data is expressed by 12 words, 11 words or 2 words. In the step S3, it is determined whether the sound data read out from the format stored in the sound data ROM 4 is the sound data of the soundless frame or the sound frame. When it is the sound data of the soundless frame, the number of the soundless frames of the sound data is detected in the timing control circuit 3. On the other hand, when it is the sound data of the sound frame, it is determined whether the sound data is the initial data of the pitch data, pitch difference data of the pitch data, or unvoiced sound. Further, in the step S3, it is determined how long the frame data is, 128 sounds/frame, 256 sounds/frame or 512 sounds/frame long. Then, it is input to the interpolator 10 to perform a differential value control. If an end code is detected, the control flow ends at the step S3. Then, the controller 2 advances the control step to a step S4. In this step, when the pitch data is the pitch difference data, it is added to the value previously sent to the interpolator 10. When the sound data is the unvoiced sound, the pitch data is output as "0" to the sound source 8. Then, the controller 2 advances the control step to a step S5. In this step, the voice parameter of eight words (i.e., the parameter $w_i$) is read out from the sound data ROM 4 and transferred to the parameter converter 6 and latched in the latch circuit 23. The controller 2 sends the address data of the lower three bits for the ROM 25 to the parameter converter 6. This address data is latched the data in the latch circuit 24 of the parameter converter 6. The ROM 25 is addressed by the address data set in the latch circuits 22 to 24. An inverse transform function of 10 bits is read out from the ROM 25. In this case, one of the memory areas 25*a* to 25*c* is specified by the data latched in the latch circuit 22 to specify one of the inverse transform functions 1 to 4, which is adaptable for a human voice or the notes of a bird or insect. The data read out into the buffer 26 is sent to the interpolator 10 and interpolated as indicated in a step S6. The output signals $O_1$ to $O_{10}$ are sent at predetermined timings to the digital filter 11. A voice/unvoiced sound and a sound source value corresponding to the pitch data, which are derived from the sound source 8, and the amplitude data from the amplitude circuit 9 are transferred to the digital filter 11 at a predetermined timing. Then, the digital filter 11 performs the sound synthesization on the basis of a predetermined algorithm, as in the step S7. In the step S8, the sound data ROM 4 is incremented and the control flow returns to the step Sl. The above operation is repeated to execute the sound synthesization. The output of the digital filter 11 is converted into an analog sound signal by the digital to analog converter 12.

In the above-mentioned embodiment, four distribution functions are stored in the ROM 25 of the parameter converter 6. For further improving the quality of the sound synthesized, it is sufficient to increase the number of distribution functions.

Figure 1A:
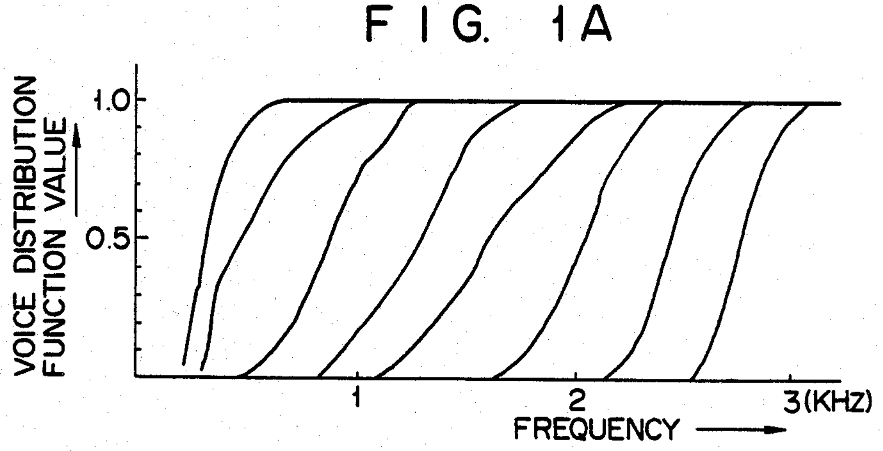
FIGS. 1A to 1C are graphs showing the frequency distributions of distribution functions of the voice of a human, and the notes of birds and insects.
Figure 1B:
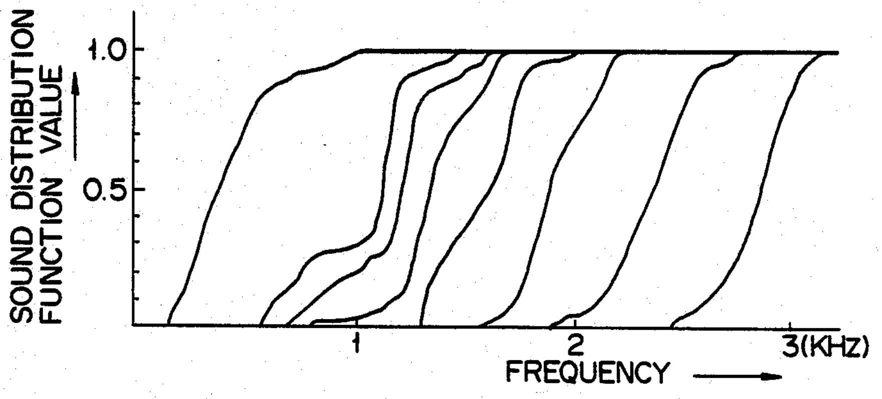
Figure 1C:
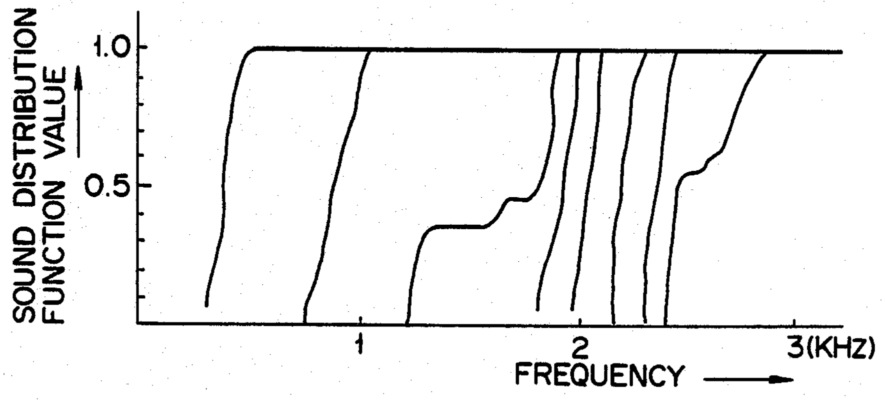
Figure 6:
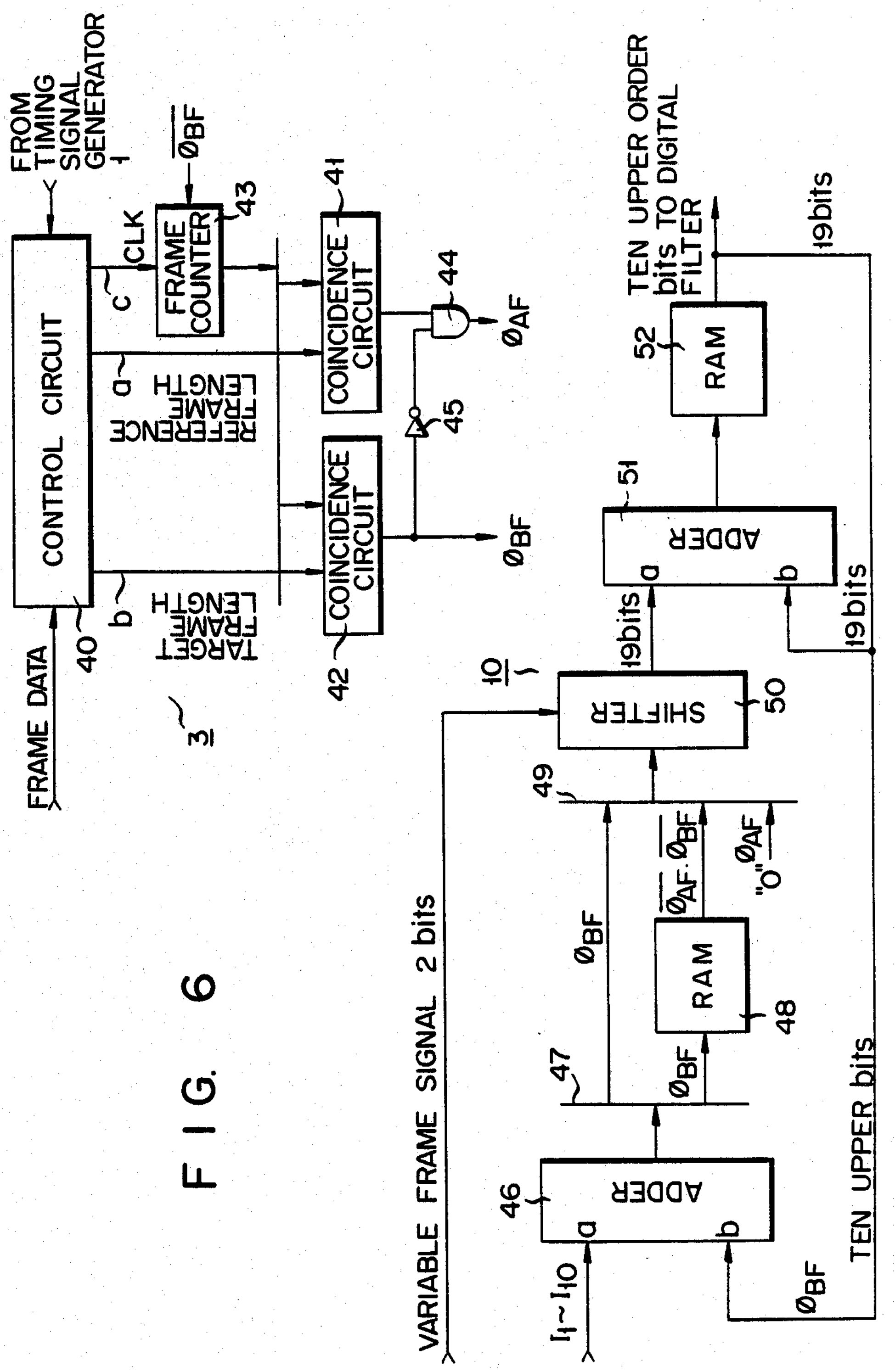
FIG. 6 is a block diagram of an interpolation circuit 10 and a timing control circuit 3, which are shown in FIG. 2.

A practical arrangement of the interpolator 10 will be described referring to FIG. 6, in connection with the timing control circuit 3. A control circuit 40 in the timing control circuit 3 is supplied with a timing signal from the timing signal generator 1 in FIG. 1 and the frame data from the controller 2. The control circuit 40 selects one of the reference frame lengths, i.e., 128 sounds, 256 sounds or 512 sounds long, according to the frame data derived from the controller 2 and applies it via an output line a to a coincidence circuit 41. At the same time, the control circuit 40 applies a target frame length to a coincidence circuit 42 via an output line b. The control circuit 40 produces a clock pulse CLK at 8 KHz, for example, which is in synchronism with one sound frame and applies it to a frame counter 43. The frame counter 43 counts the clock pulse CLK and applies the count to the coincidence circuits 41 and 42. The coincidence circuit 41 compares the reference frame length with the contents of the frame counter 43. When both data coincide with each other, it produces and applies a coincidence signal to an AND circuit 44. The coincidence circuit 42 compares the target frame length with the contents of the frame counter 43. When both data coincide with each other, it produces and applies a coincidence signal to an AND circuit 44 via an inverter 45 and also produces a target frame clock $\phi_{BE}$. The output of the AND circuit 44 is produced as a reference frame clock $\phi_{AF}$. The frame clocks $\phi_{AF}$ and $\phi_{BF}$ are transferred to the interpolator 10. An inverted signal $\overline{\phi_{BF}}$ of the target frame clock $\phi_{BF}$ is applied to the reset terminal R of the frame counter 43. The frame counter 43 is reset only at the leading edge of the clock $\overline{\phi_{BF}}$.

The interpolator 10 contains an adder 46 whose input terminal a is supplied with the data $I_1$ to $I_{10}$ from the parameter converter 6 or the amplitude circuit 9 in FIG. 2. The output of the adder 46 is applied through a gate 47 to a RAM 48 and is applied through a gate circuit 49 en route to a shifter 50 in synchronism with the frame clock $\phi_{BF}$. Further, the output of the RAM 48 is applied to the shifter 50 through the gate circuit 49 at the timings of the clocks $\phi_{AF}$ and $\phi_{BF}$. Further a logical "0" signal is applied to the shifter 50 at the timing of the clock $\phi_{AF}$. The shifter 50 shifts the 10-bit input data by 7 to 9 bits according to a variable frame signal of 2 bits from the buffer 7*a*, and applies it to the input terminal a of an adder 51. The output signal of 19 bits from the adder 51 is loaded into a RAM 52. The 19-bit data read out from the RAM 52 is input to the input terminal b of the adder 51 and the upper 10 bits data is input to the input terminal b of the adder 46 at the timing of the frame clock $\phi_{BF}$. The adder 46 subtracts the data input to the input terminal b from the data input to the input terminal a to have a difference therebetween. Of the 19-bit data read out from the RAM 52, the upper 10 bits are supplied as the output of the interpolator 10 to the digital filter 11. The control circuit 40 produces and applies the target frame length through an output line b to the coincidence circuit 42. Further, it produces and applies a clock pulse CLK through an output line c to the frame counter 43. Upon receipt of the clock pulse CLK, the frame counter 43 performs the count-up operation. When the count of the frame counter 43 becomes coincident with the reference frame length, the coincidence circuit 41 produces a coincident signal. When this signal is coincident with the target frame, the coincidence circuit 42 produces a coincident signal. When the target frame length is longer than the reference frame length, that is to say, the sounding rate is lower than the reference value (SLOW), the coincidence circuit 41 produces a coincident signal. At this time, the output of the coincidence circuit 42 is logical "0" and the output of the inverter 45 is logical "1" which is applied to the AND circuit 44. Accordingly, the output of the coincidence circuit 41 is output as the frame clock $\phi_{AF}$ through the AND circuit 44. Then, the frame counter 43 counts the clock CLK up to the target frame length. At this time, the coincidence circuit 42 produces a frame clock $\phi_{BF}$. When the target frame length is equal (NORMAL) to or shorter (FAST) than the reference frame length, the coincidence circuit 42 produces a coincidence signal as the frame clock $\phi_{BF}$. When the coincidence circuit 42 produces a coincidence signal, the output of the inverter 45 is logical "0" and the AND circuit 44 is prohibited from producing an output signal. Then, when the frame counter 43 is incremented by one, the output $\phi_{BF}$ of the coincidence circuit 42 is logical "0" and the output $\overline{\phi_{BF}}$, is logical "1" thereby to reset the frame counter 43.

In the interpolator 10, the interpolated data are sequentially loaded into the RAM 52. When the frame clock $\phi_{BF}$ is produced from the coincidence circuit 42, the target value in the frame is already stored into the RAM 52. The upper 10-bit value is input to the input terminal b of the adder 46 in synchronism with the frame clock $\phi_{BF}$. At this time, the output signals $I_0$ to $I_{10}$ of the parameter converter 6 or the amplitude circuit 9 shown in FIG. 2 are supplied to the input terminal a of the adder 46. The adder 46 subtracts the preset value supplied to the input terminal b from the next target value supplied to the input terminal a, thereby to obtain a difference thereof. The difference data output from the adder 46 is loaded into the RAM 48 in synchronism with the frame clock $\phi_{BF}$ and sent to the shifter 50 via the gate circuit 49. The shifter 50 shifts the difference data by 7 to 9 bits according to a variable frame signal of two bits. When the variable frame signal is "00", the difference data is shifted by 7 bits (128); when it is "01", the data is shifted by 8 bits (256); when it is "10", the data is shifted by 9 bits (512). In this way, a difference value D is obtained which depends on the reference frame length,. The difference value D can be obtained, at any sounding speed, by $$D = \frac{\begin{bmatrix}\text{Parameter value as a}\\ \text{target in the frame}\\ \text{length succeeding to the}\\ \text{reference frame length}\end{bmatrix} - \begin{bmatrix}\text{Maximum parameter}\\ \text{value in the}\\ \text{reference frame}\\ \text{length}\end{bmatrix}}{\text{Reference frame length (number of sounds)}}$$

Figure 7:
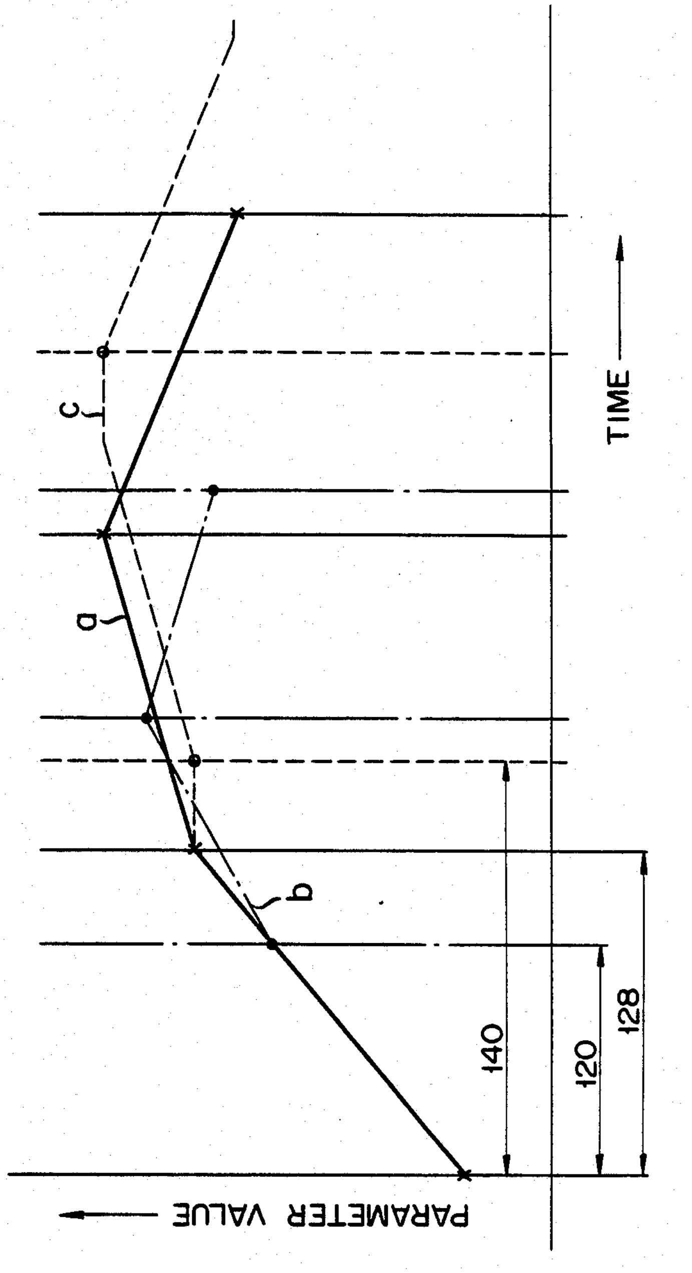
FIG. 7 graphically illustrates a relationship of a vocalizing rate and a parameter interpolation.

The difference value D produced from the shifter 50 is sent to the adder 51 and added to the data stored in the RAM 52. Then, till either of the frame clocks $\phi_{AF}$ and $\phi_{BF}$ is produced from the timing control circuit 3, the differential data held in the RAM 48 is read out through the gate circuit 49, shifted to the shifter 50 and then transferred to the adder 51. In this way, the difference value D is sequentially added to the data stored in the RAM 52, thereby to perform an interpolation processing of the parameter. The parameter loaded into the RAM 52 varies, as shown in FIG. 7, according to the target frame length produced from the output line b of the control circuit 40, that is, the vocalizing rate, NORMAL, FAST or SLOW. In FIG. 7, a solid line a indicates NORMAL of the vocalizing rate, a one-dot chain line b FAST, and a broken line c NORMAL. When the vocalizing rate is NORMAL, the target frame length is equal to the reference frame length. In the case of "128" of the reference frame length, when the count of the frame counter 43 reaches "128", the coincidence circuit 42 produces a frame clock $\phi_{BF}$. The value stored in the RAM 52 is input to the adder 46 which in turn obtains a difference of it from the target value ($I_1$ to $I_{10}$) and writes the difference value into the RAM 48. In this way, the interpolation processing is continued till the target value is reached.

When the vocalizing rate is FAST, that is, the target frame length is "120", for example, the coincidence circuit 42 produces a frame clock $\phi_{BF}$ when the count of the frame counter 43 reaches "120". Upon this, a difference of the "120" from the next target is obtained in the adder 46, as described above, and is loaded into the RAM 48 where it is subjected to the interpolation processing. In this way, the difference value of the present parameter value from the next target value is obtained every 120 sounds, as indicated by the one-dot chain line. The interpolation processing is performed in a similar manner to that in the NORMAL vocalizing rate.

When the vocalizing rate is SLOW, that is, the target frame is "140", for example, the frame clock $\phi_{AF}$ is produced from the coincidence circuit 41 through the AND circuit 44 when the count of the frame counter 43 reaches the reference frame length, "128". When the frame clock $\phi_{AF}$ is produced, the data transfer from the RAM 48 to the shifter 50 is prohibited, and a logical "0" signal is input through the gate circuit 49 en route to the shifter 50. Accordingly, the shifter 50 produces the data of all 0's and applies it to the adder 51. The data read out from the RAM 52 to the adder 51 is written into the RAM 52. Thus, when the vocalizing rate is SLOW, the addition of the difference value D is stopped when the number of sounds reaches the reference value, "128", as indicated by a broken line c. The parameter stored in the RAM 52 is held as it is. Then, when the count of the frame counter 43 reaches the target frame length, "140", the coincident circuit 42 produces a frame clock $\phi_{BF}$. In response to the frame clock $\phi_{BF}$, the adder 46 produces a difference value of the present parameter value from the next target value and writes it into the RAM 48. As described above, the interpolator 10 can interpolate the voice parameter according to the vocalizing rate, thereby realizing a high quality sound synthesization.

Figure 8:
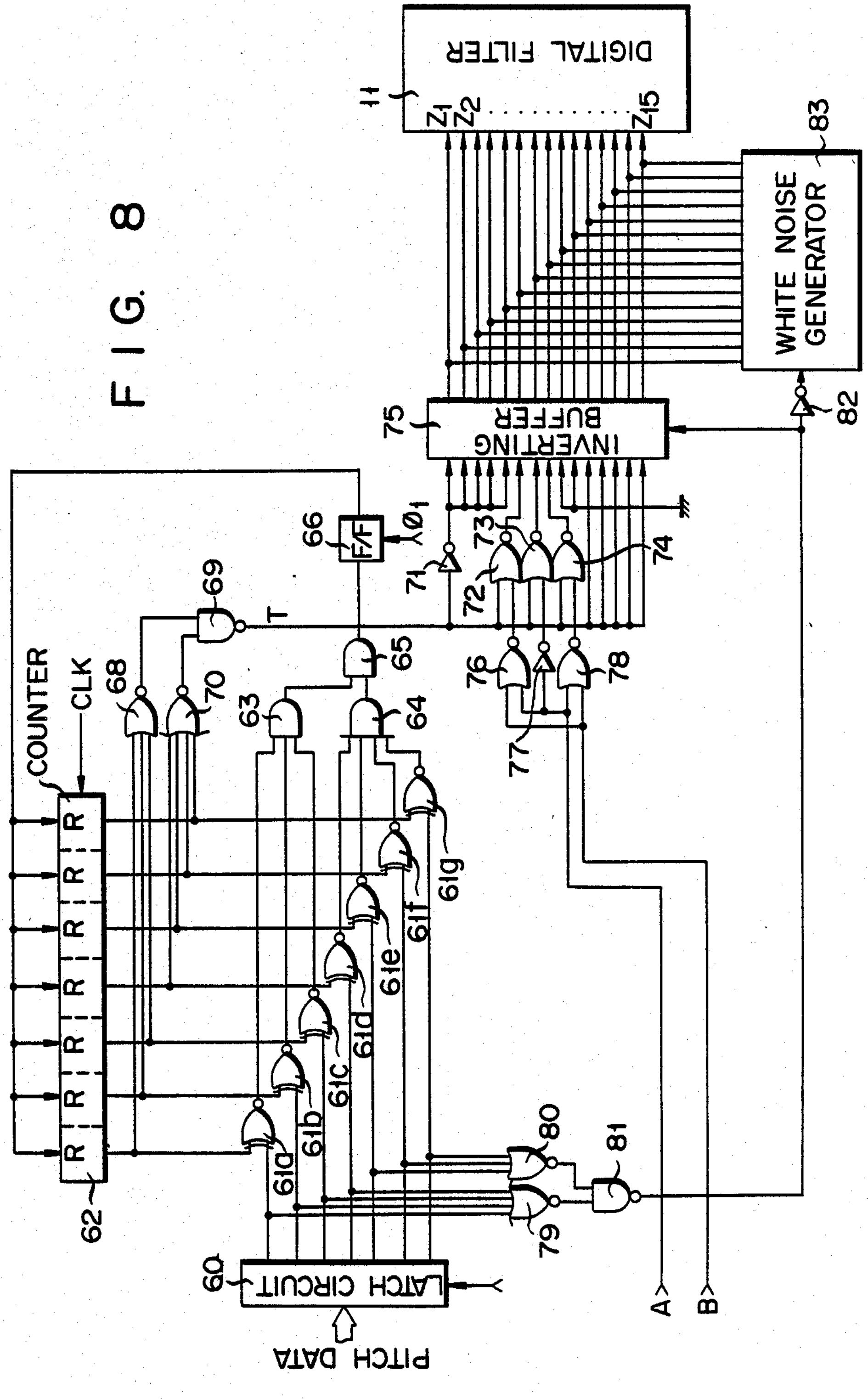
FIG. 8 is a block diagram of the sound circuit shown in FIG. 2.

Practical arrangements of the sound source 8 will be described referring to FIGS. 8 to 11. In FIG. 8, a latch circuit 60 latches the pitch data of 7 bits coming from the editing buffer 7a shown in FIG. 2 in synchronism with a predetermined timing signal. The bits of the data latched in the latch circuit 60 are respectively input to exclusive (EX) NOR circuits 61a to 61g. The 1-bit outputs of a 7-bit counter 62 are also applied to the exclusive (EX) NOR circuits 61a to 61g, respectively. The output signals from the exclusive (EX) NOR circuits 61a to 61g are supplied to an AND circuit 63. The output signals from the exclusive (EX) NOR circuits 61a to 61g are applied to an AND circuit 64. The output signals from the AND circuits 63 and 64 are applied through an AND circuit 65 en route to a flip-flop 66. The flip-flop 66 fetches the input signal in synchronism with a clock pulse $\phi_1$ and applies a reset signal to the counter 62. The counter 62 counts a clock pulse at 8 KHz, for example. The 1-bit outputs of the counter 62 are applied to the exclusive (EX) NOR circuits 61a to 61g, respectively. Of those output bits, the three upper order bits are applied through a NOR circuit 68 to a NAND circuit 69. The four lower order bits are applied to the NAND circuit 69 through a NOR circuit 70. The output T of the NAND circuit 69 is applied directly or through an inverter 71 and NOR circuits 72 to 74 to an inverting buffer 75. The inverting buffer 75 has a 15-bit width. Of those 15 bits, the 1st to 5th bits are coupled with an output of the inverter 71; the sixth to eighth bits with outputs of NOR circuits 72 to 74; the 11th to 15th bits with an output of the NAND circuit 69; the 9th and 10th bits are grounded. Sound source reference values A and B coming through the buffer 7b shown in FIG. 2 are applied to the NOR circuits 72 to 74 via a NOR circuit 76, an inverter 77 and a NOR circuit 78. The reference values A and B are applied via the NOR circuit 76 to the NOR circuits 72 to 74 and further through the NOR circuit 78 to the NOR circuit 74. The reference value A is supplied via the inverter 77 to the NOR circuit 73. Of the pitch data stored in the latch circuit 60, the four upper order bits are supplied to a NOR circuit 79 and the three lower order bits to a NOR circuit 80. The outputs command to the inverting buffer 75 via the NAND circuit 81, and applied as an output command from the NAND circuit 81 to a white noise generator 83 through the inverter 82. With the output of the NAND circuit 81, the inverting buffer 75 or the white noise generator 83 is specified, and the output signal of the circuit 81 or generator 83 specified is transferred as sound data $Z_1$ to $Z_{15}$ to the digital filter 11.

Figures 9, 10:
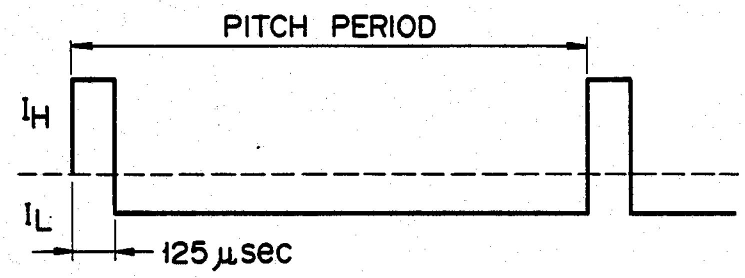
FIG. 9 shows a waveform of pitch impulses produced by the sound source circuit shown in FIG. 8.
FIG. 10 is a table illustrating impulse sound source data selected by sound source reference values A and B.

When the sound source 8 shown in FIG. 8 receives a voice signal, it produces pitch impulses. When the pitch data is latched in the latch circuit 60, the counter 62 is reset and starts the counting operation again. When the counter 62 proceeds with the count-up operation and its contents are equal to the pitch data held in the latch circuit 60, the outputs of the exclusive (EX) NOR circuits 61a to 61g are all "1's". Then, the outputs of the AND gates 63 to 65 are all "1's", and a logical "1" is loaded into the flip-flop 66. The output of the flip-flop 66 resets the counter 62. In this way, the pitch period is set. When the counter 62 is reset, the outputs of the NOR circuits 68 and 70 are logical "1" and the output T of the NAND circuit 69 logical "0". When the counter 62 produces one shot of the next clock pulse CLK, the 1st bit output of the counter 62 produces a logical "1" and the output of the NOR circuit 70 is logical "0", and the output T of the NAND circuit 69 returns to the original logical state "1". The output T of the NAND circuit 69 is held at logical "0" till the counter 62 is reset. The output I of the inverting buffer 75 takes a high level (positive) $I_H$ as shown in FIG. 9 when the output T of the NAND circuit 69 is logical "0". The period during which the output T is kept at logical "0" corresponds to one frame period, 125 μsec. The output I of the inverting buffer 75 is at low level (negative) $I_L$ when the T is logical "1". Thus, the value $I_L$ is invariable irrespective of the reference values A and B, but the value $I_H$ is switched among four values according to the combination of the reference values A and B. FIG. 10 tabulates values of the $I_H$ (when T=logical "0") and $I_L$ (when T=logical "1") for the combinations of the reference values A and B. When the reference values A and B are both logical "0", the outputs of the NOR circuits 76 and 78 and the inverter 77 are logical "1", which are inverted into logical "0" by the NOR circuits 72 to 74 and are applied to the 6th to 8th bits of the inverting buffer 75. When T=logical "0", logical "0" signals are applied to the 11th to 15th bits of the inverting buffer 75. The inverted output of logical "1" from the inverter 71 is input to the 1st to 5th bits of the inverting buffer 75. Since the 9th and 10th bits of the inverting buffer 75 are grounded, they are always logical "0". Accordingly, when the reference values A and B are both logical "0", the output $I_H$ of the inverting buffer 75 is logical "1" for the 6th to 15th bits and provides "1023". Likewise, when A=logical "0" and B=logical "1", $I_H$="255". When A=logical "0" and B=logical "1", $I_H$="511". When A=logical "1" and b=logical "1", $I_H$="127". When T=logical "1", the values of the NOR circuits 72 to 74 are kept at logical "0" irrespective of the values A and B. Therefore, the value of $I_L$ is fixed. The polarity, positive or negative, of the $I_H$ and $I_L$ is specified by the 1st bit used as a sign bit. In this way, the $I_H$ is selected to any of four values according to the combination of the reference values A and B, i.e. the kind of sounds to be synthesized. For example, for a human voice, $I_H=511$ and for the notes of a bird, $I_H=127$.

When the data latched in the latch circuit 60 takes other logical states than all "0's", the output of either of the NOR circuits 79 and 80 is logical "1". When the output of the NAND circuit 81 is logical "1", the inverting buffer 75 is specified and the inverting buffer 75 transfers a pitch impulse to the digital filter 11. At this time, the output of the inverter 82 is logical "0" and the white noise generator 83 is prohibited from producing an output and is held in a high impedance state. When the data in the latch circuit 60 is all "0's", the outputs of the NOR circuits 79 and 80 are logical "1" while the output of the NAND circuit 81 is logical "0". Therefore, the outputting of the inverting buffer 75 is prohibited and the output of the inverter 82 is logical "1". And further the output of the white noise generator 83 is applied as unvoiced sound source data to the digital filter 11. The switch between the voiced sound source and unvoiced sound source is performed every frame period.

Figure 11:
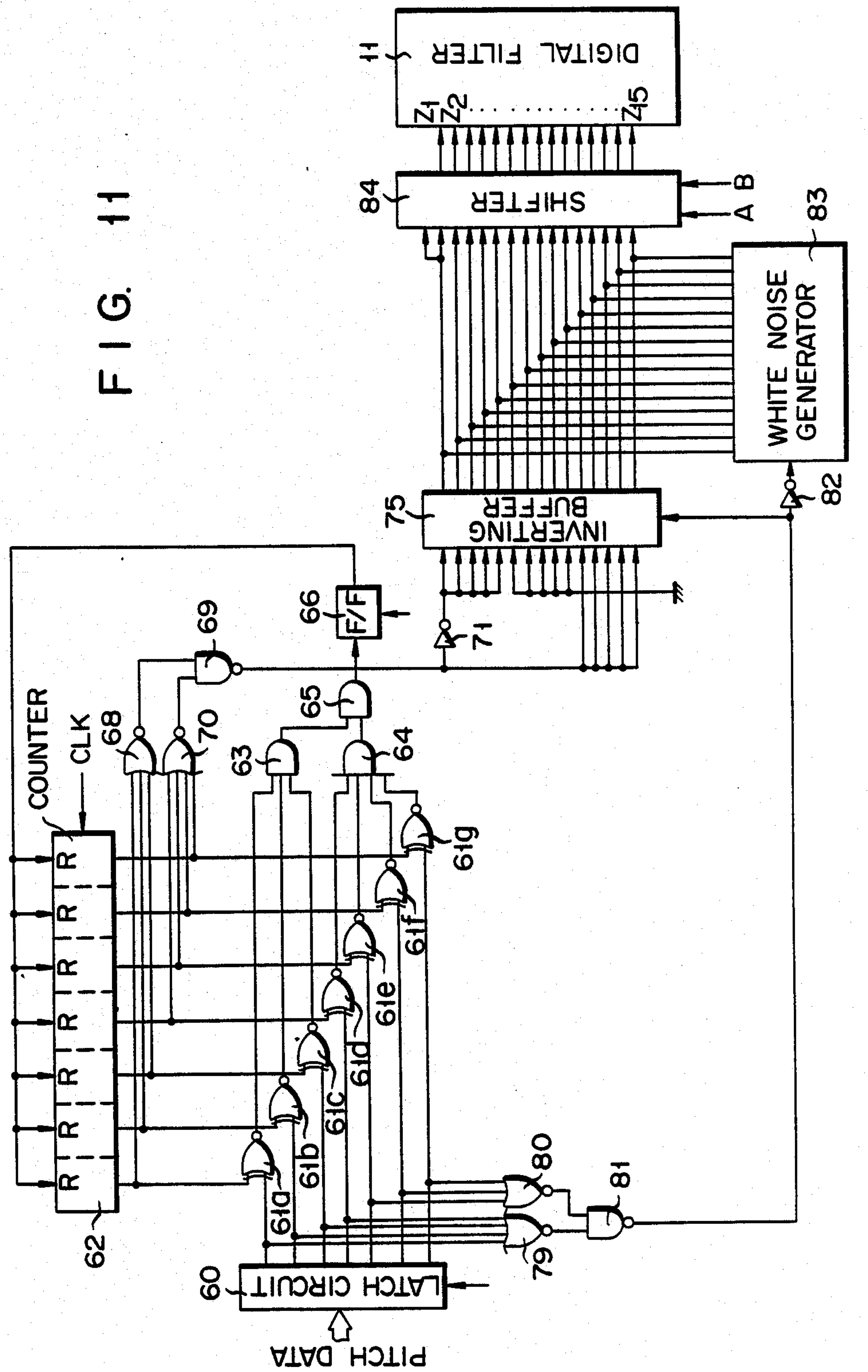
FIG. 11 is a block diagram of the digital filter shown in FIG. 2.

In the above-mentioned embodiment, in the inverting buffer 75, the value of the impulse sound source is switched according to the conversion of the reference values A and B. Alternatively, as shown in FIG. 11, a shifter 84 is provided between the white noise generator 83 and the inverting buffer 75, and the digital filter 11. By the reference values A and B, the contents of the inverting buffer 75 are shifted to the right 0 to 3 bits, thereby to switch the noise sound source as well as the impulse sound source. In this case, a sign of the most significant bit is held as it is. As seen from the above, in the present embodiment, the sound source reference values are switched according to the kind of the sound. Therefore, many voices can be synthesized by a single synthesizer without producing an overflow, ensuring a high quality of the synthesized sounds.

A practical arrangement of the digital filter 11 will be described with reference to FIGS. 12 to 18.

Figure 12:
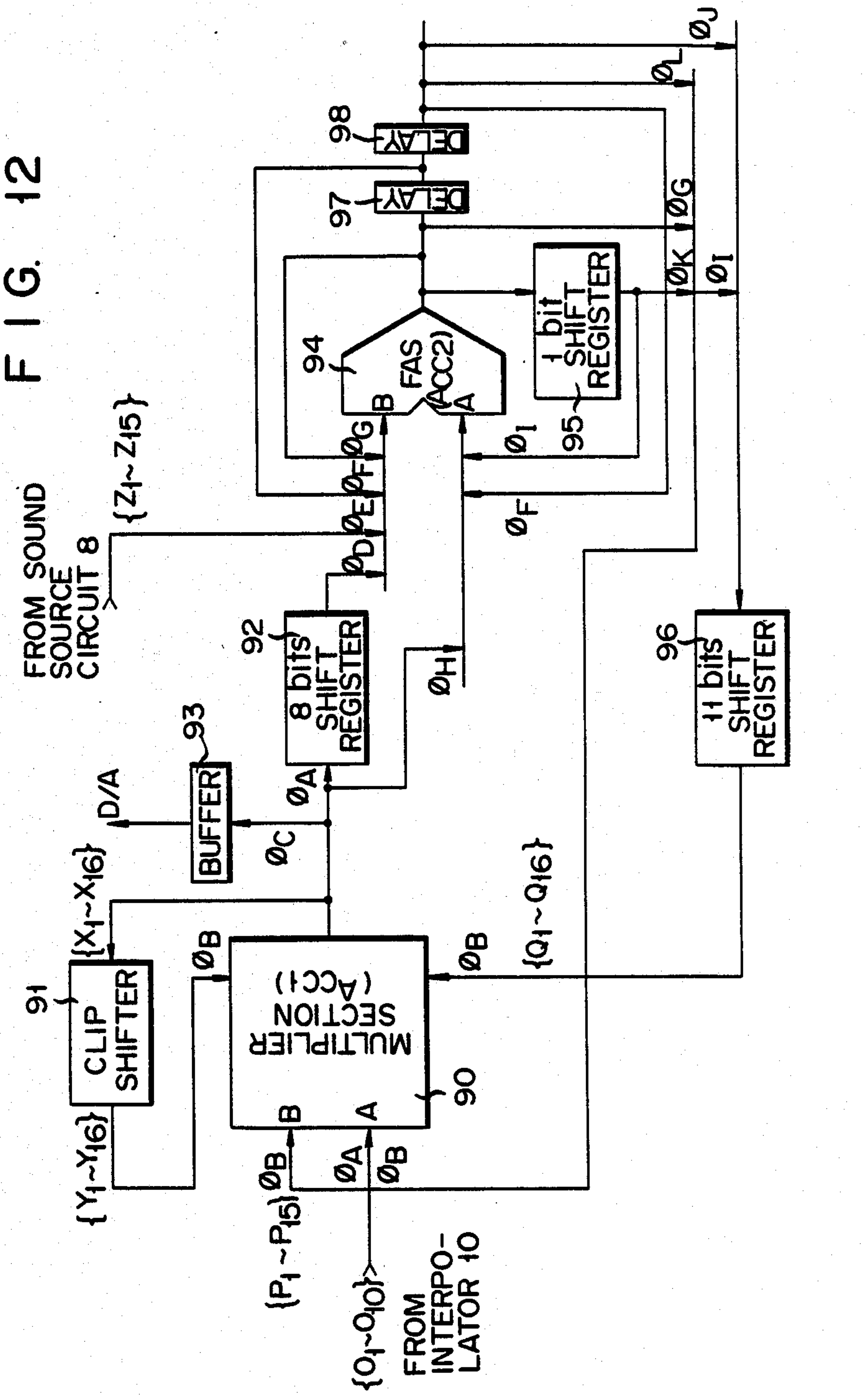
FIG. 12 shows a block diagram of another digital filter which may be used in the device shown in FIG. 2.

The seven upper order bits $O_1$ to $O_7$ from the interpolator 10 shown in FIG. 12 and the three lower order bits $O_7$ to $O_{10}$ are respectively applied to the input terminal A of a multiplier section 90 in synchronism with timing signals $\phi_A$ and $\phi_B$. The outputs $X_1$ to $X_{16}$ are input to a clip shifter 91. The shift outputs $Y_1$ to $Y_{16}$ are input to the multiplier section 90 in synchronism with the timing signal $\phi_B$. When the fixed point is doubled, the multiplier section 90 overflows for "0.5" of absolute value or more, so that even the sign of the data is probably inverted. To avoid this, the input is clipped at its approximated value by the clip shifter 91. The output of the multiplier section 90 is input into a shift register 92 of 8 bits in synchronism with the timing signal $\phi_A$, into a buffer 93 in synchronism with a timing signal $\phi_C$ and to the input terminal A of an adder/subtractor circuit 94 in synchronism with the timing signal $\phi_H$. The buffer 93 transfers the final value of the sound synthesizing to the digital to analog converter 12 in FIG. 2. The output of the shift register 92 is supplied to the input terminal B of the adder/subtractor circuit 94 in synchronism with a timing signal $\phi_D$. The sound source data $Z_1$ to $Z_{15}$ are applied from the sound source 8 in FIG. 2 to also the input terminal B in synchronism with a timing signal $\phi_E$. The output of the adder/subtractor circuit 94 is supplied to the input terminal B in synchronism with a timing signal $\phi_G$ and to the input terminal A through a one-bit shift register 95 in synchronism with a timing signal $\phi_I$. Further, the output of the one-bit shift register 95 is supplied to the input terminal B of the multiplier section 90 in synchronism with timing signals $\phi_K$ and $\phi_B$, and to an 11-bit shift register 96 in synchronism with the timing signal $\phi_I$. The outputs $Q_1$ to $Q_{16}$ of the 11-bit shift register 96 are supplied to the multiplier section 90 in synchronism with the timing signal $\phi_B$. The output signal from the adder/subtractor circuit 94 is supplied to the input terminal B of the multiplier section 90 in synchronism with the timing signals $\phi_G$ and $\phi_B$, and is taken out through a one-bit delay circuit 97. The output of the one-bit delay circuit 97 is supplied to the input terminal B of the adder/subtractor circuit 94 in synchronism with a timing signal $\phi_F$, and further taken out via a delay circuit 98 and then supplied to the input terminal B of the multiplier section 90 in synchronism with timing signals $\phi_L$ and $\phi_B$. The output of the delay circuit 98 is input into the 11-bit shift register 96 in synchronism with a timing signal $\phi_J$. In the digital filter 11, one cycle consists of timings T1 to T20. The timing signals $\phi_A$ to $\phi_L$ are generated at time points, as shown in FIG. 13. The adder/subtractor circuit 94 performs a substraction operation (b−a) at the even-numbered timings T2, T4, T6, . . . , T20 and performs an addition operation at the odd-numbered timings.

Figure 14A:
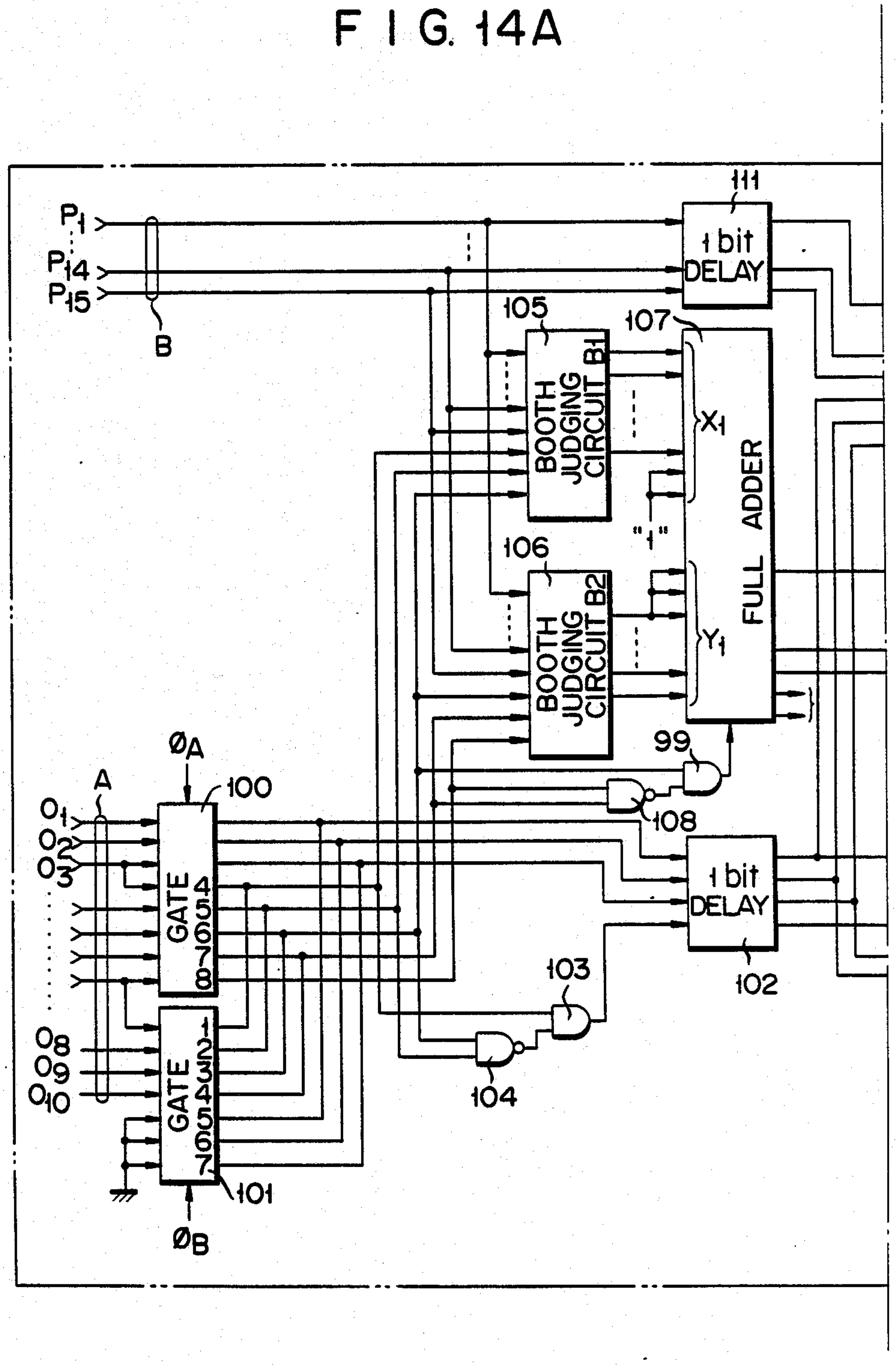
FIGS. 14A and 14B show a circuit diagram of the multiplier 90 shown in FIG. 12.
Figure 14B:
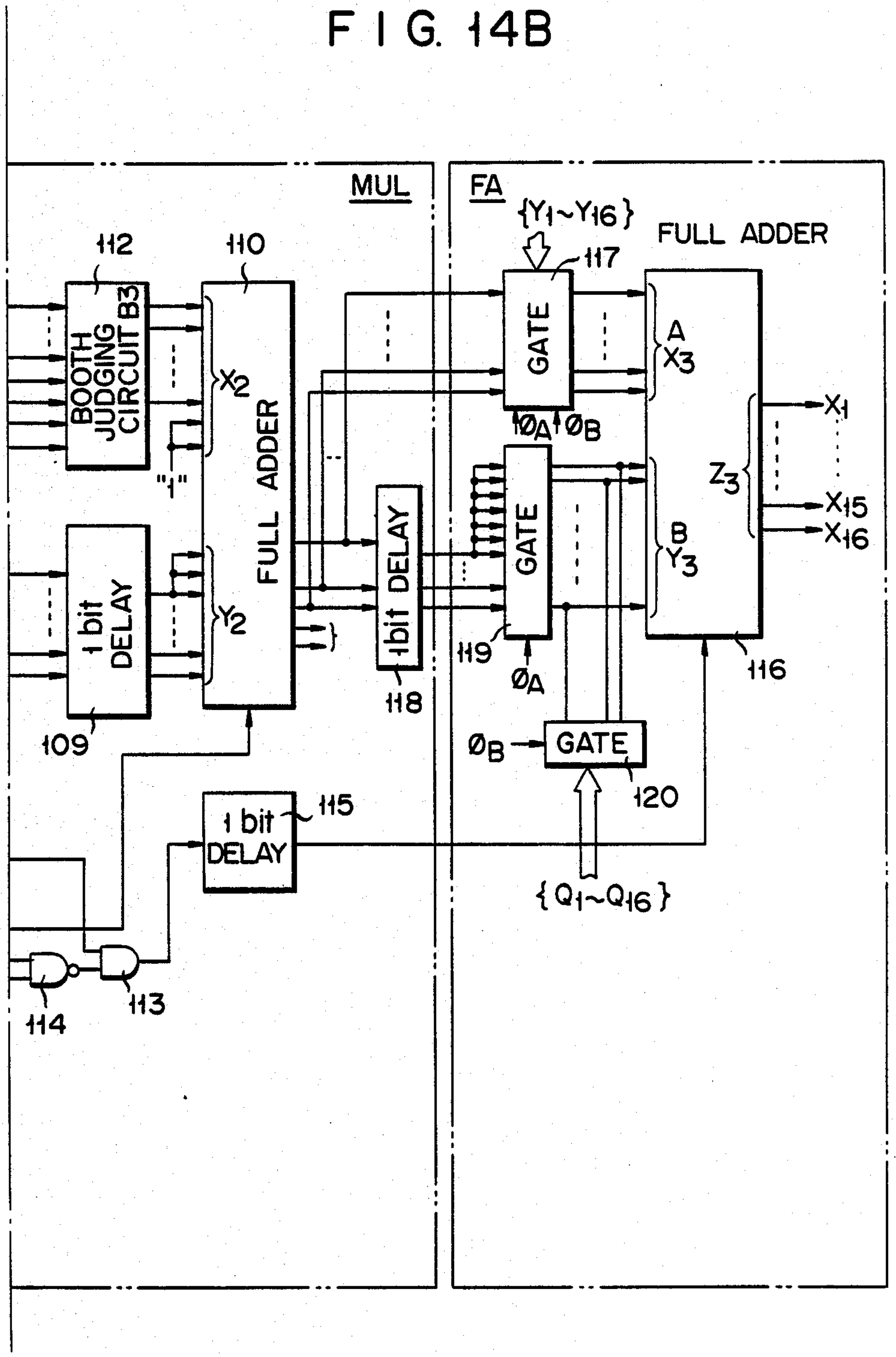

The multiplier section 90 will be described in detail, with reference to FIGS. 14A and 14B. In FIGS. 14A and 14B, reference numeral 100 designates a gate circuit for fetching the data $O_1$ to $O_7$ of those data applied from the interpolator 10 to the input terminal A in synchronism with the timing signal $\phi_A$. Reference numeral 101 designates a gate circuit for fetching the data $O_7$ to $O_{10}$ of those data applied from the interpolator 10 to the input terminal A in synchronism with the timing signal $\phi_B$. The gate circuit 101 has seven 1-bit input terminals. The input terminals of three lower order bits are grounded. The first to third output bits of the gate circuit 100 and the fifth to seventh output bits of the gate circuit 101 are coupled to a one-bit delay circuit 102. The 4th bit output of the gate circuit 100 and the first bit output of the gate circuit 101 are supplied to an AND circuit 103. The fifth and sixth bit outputs of the gate circuit 100 and the second and third bit outputs of the gate circuit 101 are supplied to the AND circuit 103 through a NAND circuit 104. The output of the AND circuit 103 is suppliled to the one-bit delay circuit 102. Outputs of the fourth to sixth bit outputs of the gate circuit 100 and the first to third bit outputs of the gate circuit 101 are suppliled to a booth judging circuit 105. The sixth to eighth bit outputs of the gate circuit 100 and the third, fourth, seventh bit outputs of the gate circuit 101 are supplied to a booth judging circuit 106. Data $P_1$ to $P_{15}$ applied to input terminal B are also supplied to the booth judging circuits 105 and 106. Outputs of the booth judging circuits 105 and 106 are sent to a full adder 107 of 18 bits. The sixth output bit of the gate circuit 100 and the third bit output of the gate circuit 101 are directly supplied to an AND circuit 107. The seventh and eighth bit outputs of the gate circuit 100 and the fourth and seventh bit outputs of the gate circuit 101 are also supplied to the full adder 107 via a NAND circuit 108. The output of the AND circuit 99 is given to the full adder 107 as a round operation command. The output of the full adder 107 is supplied to a 18-bit full adder 110 through a one-bit delay circuit 109. Data $P_1$ to $P_{15}$ supplied to the input terminal B are supplied to a booth judging circuit 112 through one-bit delay circuit 111. The three upper order output bits of the one-bit delay circuit 102 are supplied to the booth judging circuit 112. The fourth output bit of the one-bit delay circuit 102 is applied to the full adder 110 as a round operation command, and the first bit is directly supplied to the AND circuit 113. Further, the second and third bits are supplied to the AND circuit 113 via a NAND circuit 114. The output of the AND circuit 113 is transferred to the full adder 116 as a round operation command through a one-bit delay circuit 115. The output of the booth judging circuit 112 is supplied to the full adder 110 of, whose output is supplied to a gate circuit 117 as data $Y_1$ to $Y_{16}$ from the clip shifter 91. The gate circuit 117 selects only the output of the full adder 110 at the timing of $\phi_A$, and the outputs of the full adder 110 and the clip shifter 91 at the timing of $\phi_B$, and transfers them to the input terminal A of the full adder 116. Outputs of the full adder 110 are supplied to a gate circuit 119 via a one-bit delay circuit 118. The gate circuit 119 transfers the data output from the delay circuit 118 to the input terminal B of the full adder 116 in synchronism with the timing signal $\phi_A$. The input terminal B of the full adder 116 is supplied with the data Q1 to A16 from the 11-bit shift register 96 at the timing of $\phi_B$ through the gate circuit 120. The output of the full adder 116 is used as the output of the multiplier section 90. The multiplier section 90 is arranged such that a circuit section ranging from the input terminals A and B to the full adder 110 forms a multiplier MUL and another section ranging to the full adder 116 forms an adder FA.

Figure 16:
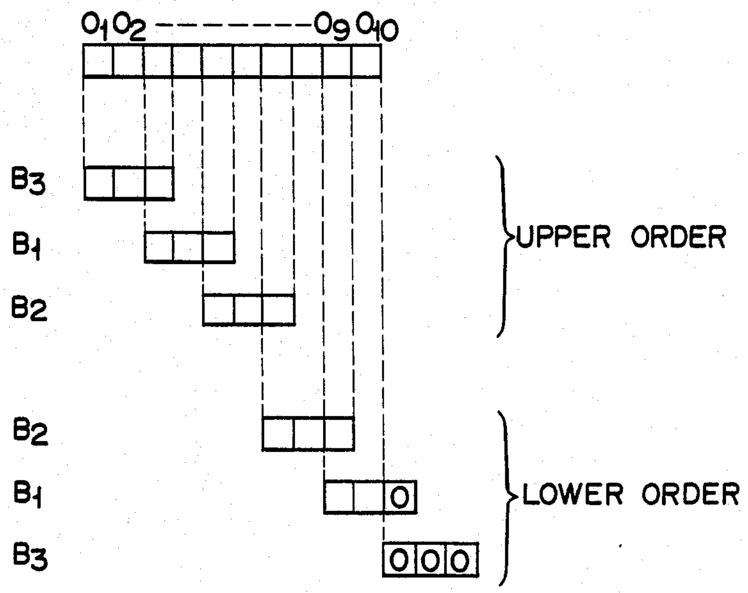
FIG. 16 illustrates a divided state of multiplying data.
Figure 17:
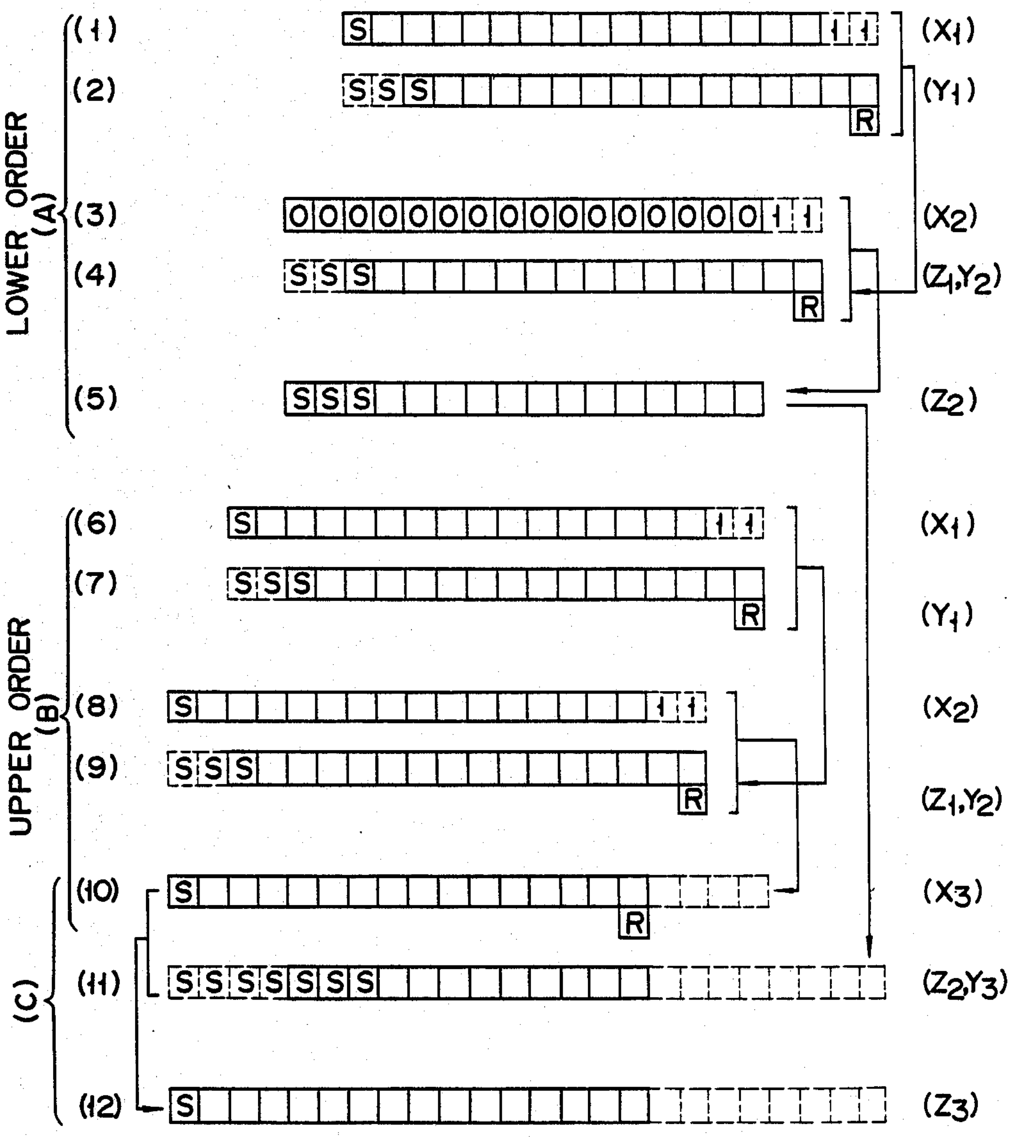
FIG. 17 shows input and output data in key portions in the multiplier section shown in FIG. 12.

The digital filter 11 containing the multiplier section 90 performs an operation using a predetermined algorithm. FIGS. 15A and 15B show input and output data at timings T1 to T20 in the multiplier MUL, adder FA, adder/subtractor circuit 94, shift register 92 (8 bit S.R), 11-bit shift register 96 (11 bit S.R), and buffer 93. In FIGS. 15A and 15B, of the inputs of the shift registers 92 and 96, those marked with a triangle (Δ) are the inputs of the shift register 92 and those with no marks are the inputs of the 11-bit shift register 96. The multiplier section 90 divides each of the 10-bit parameters C1 to C8 into groups $C_{1U}$ to $C_{8U}$ of upper order bits and groups $C_{1L}$ to $C_{8L}$ of lower order bits, each group consisting of seven bits. More specifically, the gate circuit 100 forms the groups $C_{1U}$ to $C_{8U}$ and the gate circuit 101 forms the groups $C_{1L}$ to $C_{8L}$. The gate circuits 100 and 101 also divide the voice amplitude data A transferred from the amplitude circuit 9 through the interpolator 10 into a group of seven upper bits and a group of seven lower bits. It produces the lower order voice amplitude data $A_L$ at T17 and the upper voice amplitude data $A_U$ at T18. The sound source data V(n) (Z1 to Z15) coming from the sound source 8 is supplied to the input terminal B of the adder/subtractor circuit 94 at T6 in response to the timing signal $\phi_E$. The output $e_1(n)=e_2(n)$ of the delay circuit 98 of 2 bits (2T) is supplied to the input terminal B of the multiplier MUL at T1 to T16. In this case, $e_1(n)=e_2(n)=\frac{1}{2}O_{10}(n-1)$. The output $O_{10}(n-1)$ of the adder/subtractor circuit 94 at T1 is shifted to the right by the one-bit shift register 95 and thus divided into two outputs e1(n) and e2(n). These outputs e1(n) and e2(n) are supplied to the input terminal A of the adder/subtractor circuit 94 at the timing (T1, T3) of the $\phi_I$ and to the input terminal B of the multiplier MUL at the timing (T1 to T4) of the $\phi_K$. The sound source data V(n) is first supplied to the input terminal A of the adder/subtractor circuit 94 at the timing of T6, and the operation processing starts. The output of the adder/-subtractor circuit 94 returns directly or through the one-bit delay circuit 97 to the input terminal B of the multiplier MUL. Then, the multiplier MUL multiplies the voice parameters C1 to C8 by the amplitude data A. The data $O_1$ to $O_{10}$ supplied to the input terminal A of the multiplier MUL are divided into groups of upper order bits and groups of lower order bits, each group consisting of seven bits, as shown in FIG. 16, by the gate circuits 100 and 101. Of the seven upper order bits of each group, bits $O_1$ to $O_3$ are supplied to the AND circuit 112 (B3), bits $O_2$ to $O_5$ to the booth judging circuit 105 (B1), and bits $O_5$ to $O_7$ to the booth judging circuit 106 (B2). Of the seven lower order bits of each group, bits $O_7$ to $O_9$ are transferred to the booth judging circuit 106 (B2), bits $O_9$ and $O_{10}$ and a "0" signal are transferred to the booth judging circuit 105 (B1), and three lower order bits, "000", are supplied to the booth judging circuit 112 (B3). The booth judging circuits 105 and 106 are supplied with 15-bit data P1 to P15 at the timing of the $\phi_B$ by way of the input terminal B. The outputs of the booth judging circuits 105 and 106 respectively are transferred to the input terminals $X_1$ and $X_L$ of the full adder 107 and are added together. In this case, the data applied to the input terminal $X_1$ of the full adder 107 is such that the most significant bit thereof is a sign bit S and the two lower order bits are logical "1", as shown in FIG. 17(1). The data applied to the input terminal $Y_1$ of the full adder 107 is such that the three upper order bits are sign bits S and the least significant bit contains a rounding bit R of the booth, as shown in FIGS. 17(1) and 17(2). The data shown in FIGS. 17(1) and 17(2) are added together in the full adder 107 and the result of the addition is input from its output terminal $Z_1$ through the one-bit delay circuit 109 to the input terminal $Y_2$ of the full adder 110. In this case, the two lower order bits of the data output from the output terminal Z1 of the full adder 107 are discarded, as shown in FIG. 17(4). All "0's" data is supplied from the booth judging circuit 112 at the timing of the lower order bits to the input terminal $X_2$ of the full adder 110, as shown in FIG. 17(3). Further, a logical "1" signal is attached to the two lower order bits. The data shown in FIGS. 17(3) and 17(4) are added by the full adder 110 and the sum is output from the output terminal Z2, as shown in FIG. 17(5). In this case, the two lower order bits of the data output from the output terminal Z2 are discarded. FIGS. 17(1) to 17(5) show the data processing of the lower order bits. The upper order bits likewise are processed as illustrated in FIGS. 17(6) to 17(10). FIGS. 17(10) to 17(12) show states of the data at the input terminals $X_3$ and $Y_3$ and the output terminal $Z_3$ of the full adder 116.

The multiplier MUL requires an operation time of 2-bit time. The result of the operation $C_{1L}\cdot e_1(n)$ of the data input at the timing of T1 in FIG. 15A is output at the timing of T3. The result of the operation $C_{1U}\cdot e_1(n)$ of the data which is output at T3 and input at T2 is produced at T4. The result of the operation of the data $C_{1L}\cdot e_1(n)$ which is produced from the full adder 110 in the multiplier MUL, is delayed one bit in the delay circuit 118 and is supplied to the input terminal B of the full adder 116 in an adder FA at T4 through the gate circuit 119. The data $C_{1U}\cdot e_1(n)$ output from the full adder 110 at T4 is supplied to the input terminal A of the full adder 116 via the gate circuit 117. Accordingly, the full adder 116 adds both the input data and delays the sum of the addition $C_1\cdot e_1(n)$ by one-bit time and delivers it at T5. The result of the addition $C_1\cdot e_1(n)$ is doubled by the clip shifter 91 to be $2C_1\cdot e_1(n)$, which returns to the input terminal A of the adder FA. The data $e_1(n-1)$ is supplied from the 11-bit shift register 96 through the gate circuit 120 to the input terminal B of the adder FA, i.e. the input terminal B of the full adder 116. The result of the addition performed by the adder FA at the timing of T5 is produced as $e_1'(n)$ at the timing T6 and is applied to the input terminal of the adder/subtractor circuit 94. In this way, at the timings T1 to T20, the processing shown in FIGS. 15A to 15B is performed. Then, the output of the multiplier section 90 is loaded into the buffer 93 in synchronism with the timing signal $\phi_C$, i.e. the timing of T1. At the timings of T17 and T18, the data $O_{10}(n-1)$ after the filter operation is multiplied by the amplitude data $A_L$ and $A_U$, and the products are added together to have $[A\cdot O_{10}(n-1)]$. The final composed result $[A\cdot O_{10}(n-1)]$ is produced from the adder FA in the form of $[U(n-1)]$ at T1 in the next cycle. The composed output is loaded into the frame counter 43 in synchronism with the timing signal $\phi_C$. The data $[U(n-1)]$ loaded into the buffer 93 is held as a voice output till T20 in the next cycle, suppliled to the digital-to-analog converter 12 and converted into an analog signal.

Figure 18:
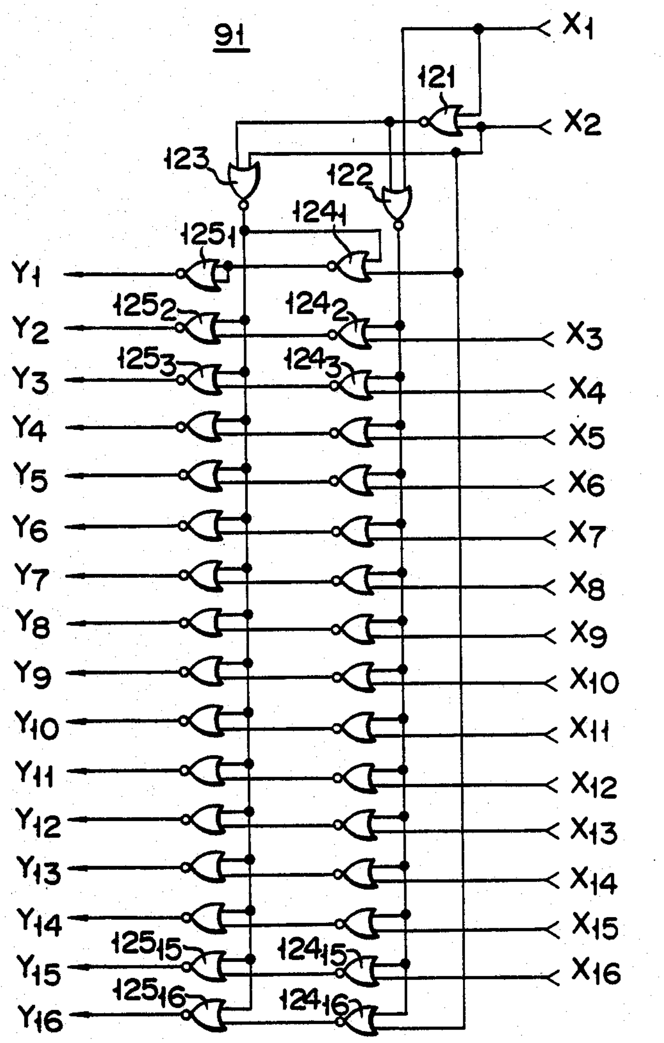
FIG. 18 shows a circuit arrangement of the clip shifter 91 shown in FIG. 12.

The clip shifter 91 will be described in detail with reference to FIG. 18. Of the data $X_1$ to $X_{15}$ derived from the multiplier section 90, the sign bit $X_1$ is supplied to NOR circuits 121 and 122, and the $X_2$ bit is supplied to NOR circuits 123, $124_1$ and $124_{16}$ and NOR gates 122 and 123 via the NOR circuit 121. The output of the NOR gate 122 is supplied to NOR circuits $124_2$ to $124_{16}$. The bits $X_3$ to $X_{16}$ are supplied to the NOR circuits $124_2$ to $124_{15}$, respectively. The output of the NOR circuit 123 is applied through the NOR gate $124_1$ to a NOR circuit $125_1$, and to NOR circuits $125_2$ to $125_{16}$. The outputs of the NOR circuits $124_1$ to $124_{16}$ are passed through the NOR circuits $125_1$ to $125_{16}$ and used as outputs $Y_1$ to $Y_{16}$ of the clip shifter 91, which are supplied, to the multiplier section 90.

The clip shifter 91 thus arranged has a data shift function when the bits $X_1$ and $X_2$ are "0,0" or "1,1", and outputs the bits $X_3$ to $X_{16}$ as $Y_2$ to $Y_{15}$. In this case, when the sign bit X is logical "0", $Y_1$ and $Y_{16}$ are logical "0". When the sign bit $X_1$ is logical "1", $Y_1$ and $Y_{16}$ are logical "1". When the bits $X_1$ and $X_2$ are "0,1" or "1,0", if it is shifted, an overflow occurs. To avoid this, the clip function is provided and when the sign bit $X_1$ is logical "0", $Y_1$ is logical "0" and $Y_2$ to $Y_{16}$ are all "0,s". When the overflow occurs due to the shift operation, it is clipped at its approximate value.

In the above-mentioned embodiment, the multiplier factor applied to the multiplier is divided into the upper order bits and the lower order bits by the digital filter 11. The partial products of the upper and lower order bits are obtained. The lower order bits or those with a specified bit attached thereto are added to the partial products. The two lower order bits of the result of the addition are discarded. This eliminates a deviation of an error in positive or negative direction, improving the operation accuracy.

What we claimed is:

1. An LSP sound synthesizer, comprising:

sound data memory means for storing sound data including at least sound source reference value data, parameter data, frame data, pitch data and amplitude data;

parameter converting means connected to the sound data memory means and including memory means having at least two memory areas for storing different inverse transform functions, each of said memory areas corresponding to a sounded voice and arranged to be selected by a signal designating the voice associated with the selected memory area, wherein said parameter data is converted into parameter output data in accordance with the inverse transform function stored in the selected memory area;

sound source circuit means connected to said sound data memory means, which receives said pitch data and said sound source reference value data from said sound data memory means and produces a predetermined sound source output; and digital filter means connected to said parameter conversion means and said sound source circuit means, said digital filter means synthesizing sounds on the basis of said frame data and said converted parameter output data, and said digital filter means includes a multiplier section, said multiplier section including means for dividing a multiplier factor of the amplitude data derived from said parameter conversion means into the upper and lower order bits and for calculating a partial product of the upper order bits and a partial product of the lower order bits, means for attaching a specific bit to either of the upper or lower order bits of the partial product obtained by said calculating means and then for adding the upper and lower partial products, and means for discarding the lower bits of the result of the addition by said attaching means and for transferring the result of the addition to the succeeding processing stage.

2. An LSP sound synthesizer according to claim 1, further including interpolator means which is connected between said parameter converting means and said digital filter means and interpolates said converted parameter output from said parameter converting means according to a vocalizing rate.

3. An LSP sound synthetisizer according to claim 1, wherein said sound source circuit means includes a latch circuit for selecting pitch data delivered from said sound data memory means, counter and gates means for setting a pitch period according to the pitch data selected by said latch circuit, and inverting buffer means for selectively controlling said sound source reference value data by the output from said counter and gates means.

4. An LSP sound synthesizer according to claim 2, wherein said interpolation means includes:

means for calculating a parameter differential value every frame length using the following equation $$D = \frac{\begin{bmatrix}\text{Parameter value as a}\\ \text{target in the frame}\\ \text{length succeeding to the}\\ \text{reference frame length}\end{bmatrix} - \begin{bmatrix}\text{Maximum parameter}\\ \text{value in the}\\ \text{reference frame}\\ \text{length}\end{bmatrix}}{\text{Reference frame length}}$$

means which adds a parameter differential value of the calculated parameter value as a target and the present parameter value as a reference value to a maximum parameter in the present frame length, when a vocalizing rate is higher than a reference rate, and means which adds said calculated parameter differential value to the maximum parameter value in the present frame length, when said vocalizing rate is below the reference rate, and keeps said target parameter value at a fixed value in the target frame length.

* * * * *

UNITED STATES PATENT AND TRADEMARK OFFICE
CERTIFICATE OF CORRECTION

PATENT NO. : 4,653,099

DATED : March 24, 1987

INVENTOR(S) : KANKE et al

It is certified that error appears in the above-identified patent and that said Letters Patent is hereby corrected as shown below:

Title page, left-hand column, in the title of the invention, "SP Sound Synthesizer", should read -- LSP Sound Synthesizer --.

Signed and Sealed this

Ninth Day of February, 1988

*Attest:*

DONALD J. QUIGG

*Attesting Officer* *Commissioner of Patents and Trademarks*